US012576555B2

(12) United States Patent
Medina et al.

(10) Patent No.: US 12,576,555 B2
(45) Date of Patent: Mar. 17, 2026

(54) APPARATUS AND METHOD FOR MOVING PAIRS OF WORKPIECES HAVING A ROUGH FACE AND AN OPPOSITE FINISHED FACE

(71) Applicant: GMM S.p.A., Gravellona Toce (IT)

(72) Inventors: Riccardo Medina, Gravellona Toce (IT); Simone Guazzoni, Gravellona Toce (IT); Davide Comelli, Gravellona Toce (IT)

(73) Assignee: GMM S.P.A, Gravellona Toce (IT)

( * ) Notice: Subject to any disclaimer, the term of this patent is extended or adjusted under 35 U.S.C. 154(b) by 0 days.

(21) Appl. No.: 18/261,125

(22) PCT Filed: Jan. 11, 2022

(86) PCT No.: PCT/IB2022/050168

§ 371 (c)(1),
(2) Date: Jul. 12, 2023

(87) PCT Pub. No.: WO2022/153167

PCT Pub. Date: Jul. 21, 2022

(65) Prior Publication Data

US 2024/0066757 A1 Feb. 29, 2024

(30) Foreign Application Priority Data

Jan. 13, 2021 (IT) ........................ 102021000000497

(51) Int. Cl.
*B28D 7/04* (2006.01)

(52) U.S. Cl.
CPC ............. *B28D 7/043* (2013.01); *B28D 7/046* (2013.01)

(58) Field of Classification Search
CPC ........ B28D 7/043; B28D 7/046; B65G 47/24; B65G 47/248; B65G 47/252; B25J 15/0028; B25J 15/0253; B21D 43/105
(Continued)

(56) References Cited

U.S. PATENT DOCUMENTS 3,655,232 A * 4/1972 Martelee .................. B66C 1/42
294/905
3,905,632 A * 9/1975 Caylor ..................... B66C 1/30
294/67.33
(Continued)

FOREIGN PATENT DOCUMENTS

CN 209920276 U 1/2020
EP 1219398 A2 7/2002
(Continued)

OTHER PUBLICATIONS

European Patent Office, International Search Report and Written Opinion issued on May 27, 2022, for International Patent Application No. PCT/IB2022/050168.
(Continued)

*Primary Examiner* — Gregory W Adams
(74) *Attorney, Agent, or Firm* — Duane Morris LLP

(57) ABSTRACT

An apparatus includes a piece-supporting plane to support one or more worked pieces, and first and second gripping devices, respectively defining first and second gripping planes of a worked piece. The apparatus moves the first and the second gripping devices among: a picking position wherein the first or the second gripping device is configured to pick up a worked piece laid on the piece-supporting plane; an exchange position wherein the first gripping device and the second gripping device are mutually oriented such that the first and the second gripping planes of the worked piece are facing each other to allow transferring the worked piece from the first gripping device to the second gripping device, or vice versa; and a laying position, wherein the second gripping device or the first gripping device is configured to release the worked piece being transferred in the exchange position in a piece storage area.

32 Claims, 21 Drawing Sheets

(58) Field of Classification Search
USPC ........ 414/626, 758, 759, 771, 773, 776, 783
See application file for complete search history.

(56) References Cited

U.S. PATENT DOCUMENTS

| | | | | | |
|---|---|---|---|---|---|
| 4,256,429 | A * | 3/1981 | Dwyer | B66C 1/447 294/197 |
| 4,436,078 | A | 3/1984 | Bourke | |
| 4,892,183 | A * | 1/1990 | Fenton | B65G 47/907 901/7 |
| 4,921,387 | A * | 5/1990 | Bennington | B21D 43/105 414/758 |
| 4,925,225 | A * | 5/1990 | Dost | B66C 1/0293 294/186 |
| 5,163,729 | A * | 11/1992 | Borcea | B25J 15/026 294/207 |
| 6,523,875 | B1 * | 2/2003 | Ostholt | B25J 15/0253 294/207 |
| 6,994,510 | B2 * | 2/2006 | Cooke | B66C 17/00 414/626 |
| 7,695,239 | B2 * | 4/2010 | Wu | B25J 15/0028 294/81.4 |
| 7,954,623 | B2 * | 6/2011 | Helm | B65G 59/02 198/468.4 |
| 8,061,959 | B2 * | 11/2011 | Fan | H05K 13/0061 91/375 R |
| 8,651,543 | B2 * | 2/2014 | Matsuoka | B65G 47/90 294/902 |
| 8,931,999 | B2 * | 1/2015 | Dorner | B65H 3/40 414/797 |
| 10,440,870 | B1 * | 10/2019 | Solanki | H05K 13/0408 |
| 2006/0099064 | A1 * | 5/2006 | Anaki | B65G 49/068 414/797 |
| 2013/0108408 | A1 * | 5/2013 | Saison | B65H 3/0816 414/797 |
| 2013/0295721 | A1 * | 11/2013 | Lyu | H01L 21/50 438/108 |
| 2017/0305035 | A1 | 10/2017 | Toncelli | |
| 2018/0272542 | A1 | 9/2018 | Viora | |
| 2024/0066757 | A1 * | 2/2024 | Medina | B28D 7/046 |

FOREIGN PATENT DOCUMENTS

| | | | | |
|---|---|---|---|---|
| EP | 3040172 | A1 | 7/2016 | |
| JP | 02225225 | A * | 9/1990 | B65G 49/068 |
| RU | 2089319 | C1 | 9/1997 | |
| WO | 2011144270 | A1 | 11/2011 | |

OTHER PUBLICATIONS

Office Action issued for corresponding Chinese Patent Application No. 202280017605.4 dated May 27, 2024, 12 pages.
Decision to Grant issued for corresponding Russian Patent Application No. 2023117519 dated Jul. 4, 2024, 44 pages.
Examiner's Report for corresponding Canadian Patent Application No. 3,208,293 dated Apr. 26, 2024, 3 pages.

* cited by examiner

APPARATUS AND METHOD FOR MOVING PAIRS OF WORKPIECES HAVING A ROUGH FACE AND AN OPPOSITE FINISHED FACE

FIELD OF THE INVENTION

The present invention relates to the field of moving worked pieces. In particular, the present invention relates to an apparatus for moving worked pieces and a method for moving pairs of worked pieces, for example slabs of stone material, having a rough face and an opposite finished face.

The term "finished face" means a face of the worked piece to which one or more finishing operations, such as sanding, polishing, sandblasting, brushing or the like, have been carried out. Typically, these finishing operations take place following rough machining and are aimed at reducing surface roughness and any dimensional inaccuracies of the face. The term "rough face" means a face of the worked piece directly resulting from rough machining operations such as cutting or milling and not subjected to finishing operations.

Typically, a rough face has characteristics of surface roughness and/or appearance and/or dimensional errors significantly worse than a finished face.

RELATED ART

The production of worked pieces with a rough face and an opposite finished face is for example typical of the processing of stone materials such as marble and granite in the form of slabs or blocks. Such pieces can be used in applications where the finished part of the piece is visible and the unfinished part of the piece is hidden. For example, the worked pieces can be used as elements of walls, furnishings and/or floors in such a way that the finished face is visible and the opposite rough face is anchored to a structure or resting on the ground and therefore hidden.

Typically, the mechanical machining of pieces starting from raw materials or semi-finished products provides that the worked pieces are firstly machined in a machine or assembly of machines organised in a production line, the machine(s) being suitably configured to perform machining operations such as cutting, milling, drilling and surface finishing.

The worked pieces are then transferred at the end of the machining cycle to a temporary supporting plane, which is generally provided downstream of the machine or assembly of machines.

By "supporting plane" it is meant a surface suitable for supporting worked pieces that can receive them from the machine or assembly of machines. The supporting plane may, for example, consist of an end portion of a conveyor that moves the worked pieces through the machine or assembly of machines, or of a special plane that receives the worked pieces from the processing space provided in the machine or assembly of machines.

Typically, worked pieces lying on the supporting plane have a predetermined orientation resulting from the machining cycle they undergo. With reference to the aforementioned field of processing pieces made of stone materials, it is for example typical that the rough face of the worked pieces is resting on the supporting plane and the finished face is facing upwards.

In this context, the temporary supporting plane must be cleared of worked pieces, which are transferred to a piece storage area where the worked pieces are unloaded for subsequent transport, storage operations or further processing.

By "piece storage area" it is meant any area that can receive and house worked pieces, even if only temporarily, and is for example defined on pallets, in special containers, or on loading/unloading conveyors or machine worktops.

SUMMARY OF THE INVENTION

In the field of mechanical machining of pieces, machines for machining pieces in sheet or block form are known, as well as equipment for loading/unloading materials in sheet form, which enable the automated movement of worked pieces from the work plane.

Document WO 2011/144270 A1, in the name of the same Applicant, for example, shows a machine for processing materials in block or slab form comprising a handling group whose function is to hold a slab suspended from a work surface, allowing it to be repositioned. The handling group is of a pneumatic type and comprises gripping means equipped with one or more pneumatically activated suction cups, which can be tilted between an initial non-operative position, wherein the suction cups cannot interact with the slab, and a final operative position, where the suction cups can come into contact with the upper surface of the slab. The gripping means of the handling group include a plate and related suction cups. The plate is integrally fixed to a tool holder assembly and can be rotated with the same about an axis. The non-operative position of the plate is vertical; the operative position of the plate is horizontal.

US 2018/0272542 A1 shows a gripping device used in apparatuses for loading/unloading slab materials. The gripping device has a first articulated structure supporting a first gripping handling group and a second articulated structure supporting a second gripping handling group. The gripping heads include an engagement plate which, due to its mounting on the articulated structure and the type of movement imposed by the articulated structure itself, always faces downwards. The articulated structures are movable independently of each other. It is possible to pick up and lay down a worked piece via a single gripping handling group, for example by means of the first gripping handling group by retracting the second gripping device handling group. By adjusting the distance between the two gripping heads and by rotating 360° about its vertical axis, the gripping device, mounted on an overhead crane or a robot, can pick up and deposit a worked piece, constraining the same by means of tools mounted on the first and second gripping handling groups.

In this context, the Applicant perceived the need to arrange the worked pieces in the storage area also with a different orientation from that on the supporting plane, i.e. being able to decide for a given piece whether to keep the original orientation or to change it. The Applicant noted that the machines disclosed in WO 2011/144270 A1 and US 2018/0272542 A1 only allow limited changes in the orientation of the picked piece.

For example, the Applicant noted that the gripping devices disclosed in WO 2011/144270 A1 and US 2018/0272542 A1 do not allow to deposit the worked piece in an overturned configuration with respect to the starting configuration.

Further, the Applicant noted that the above-described gripping devices grip the pieces at a gripping face and cannot arrange that gripping face against a wall or another piece.

The unloading of worked pieces in an upside down configuration with respect to the initial configuration can therefore only be carried out manually by operators.

Therefore, the Applicant considers that there is a need for an apparatus for moving worked pieces that allows for greater flexibility in the final arrangement of the worked pieces in the storage area.

In the case of pieces having a finished face and an opposite rough face, e.g. pieces worked from stone materials, the Applicant has observed that if the pieces were stacked with the same orientation to each other, the rough face of one piece would come into contact with the finished face of the adjacent piece and risk damaging it.

The Applicant further perceived that if the pieces were stacked in alternate orientations, the finished face of one piece would contact the finished face of the adjacent piece (if any), preventing or minimising the risk of damaging the finished face of the worked piece. However, the known gripping devices described above do not allow for this "alternating" arrangement of the finished face between one worked piece and the adjacent piece in a storage area.

The present invention thus relates, according to a first aspect, to an apparatus for moving worked pieces comprising:

- a piece-supporting plane configured to support one or more worked pieces;
- a first gripping device and a second gripping device, respectively defining a first and a second gripping plane of a worked piece;

wherein the apparatus is configured to move the first and the second gripping device among:

- i) a picking position wherein the first or the second gripping device is configured to pick up a worked piece laid on the piece-supporting plane;
- ii) an exchange position wherein the first gripping device and the second gripping device are mutually oriented such that said first and second gripping planes of the worked piece are facing each other to allow transferring the worked piece from the first gripping device to the second gripping device, or vice versa; and
- iii) a laying position, wherein the second gripping device or the first gripping device is configured to release in a piece storage area the worked piece transferred in the exchange position.

The term "gripping plane" is used to indicate a plane on which the worked piece to be moved is positioned, defined by the gripping device and on which the worked piece to be moved is held by appropriate retaining elements of the gripping device. The gripping plane may, for example, be defined by a face of the gripping device by means of which it is possible to exert a retaining action on the worked piece to be moved, for example by means of a pneumatic retaining action by one or more suction cups, or of a magnetic retaining action by one or more magnets, or of a mechanical retaining action by one or more jaw-type gripping devices.

Thanks to the above configuration and cooperation of parts, the apparatus according to the invention is advantageously capable to automatically and flexibly handle the layout of the worked pieces in the storage area by orienting the finished face of the pieces in the desired and most appropriate manner.

Thus, for example, the apparatus according to the invention is advantageously capable of automatically arranging the worked pieces in the storage area by alternating the orientation of the finished face between a worked piece and the adjacent worked piece so as to prevent the finished face of the pieces being placed in contact with a rough face with possible damages.

According to the invention, in fact, it is provided that the worked piece is initially arranged on the work surface with at least one face visible and at least one face resting on the work surface.

At least one of the first and second gripping devices is configured to grip a worked piece by placing the respective gripping plane next to the visible face of the worked piece.

The gripping device that gripped the worked piece is movable in the exchange position in such a way that the face of the worked piece initially resting on the supporting plane is facing away from the gripping device.

The other gripping device is movable towards the exchange position so that its own gripping plane can approach the face of the worked piece initially resting on the supporting plane and then grip the worked piece.

The worked piece can thus be exchanged between the two gripping devices in such a way that the face of the piece initially visible, e.g. the worked one, is oriented away from the receiving gripping device and thus visible again, while the face of the worked piece initially supported is oriented towards the receiving gripping device and thus not visible again.

The gripping device that received the worked piece may be moved to the laying position and place the face of the worked piece initially visible against a wall or horizontal plane or against another piece, since this face does not face the gripping device.

In a second aspect thereof, the present invention relates to a method for moving pairs of worked pieces having a rough face and an opposite finished face by means of an apparatus for moving worked pieces comprising:

- a piece-supporting plane configured to support one or more worked pieces;
- a first gripping device and a second gripping device, respectively defining a first and a second gripping plane of a worked piece;

the method comprising the steps of:

a) providing a plurality of worked pieces with a rough face laid on the piece-supporting plane and a finished face facing away from the piece-supporting plane or vice versa, with a finished face laid on the piece-supporting plane and a rough face facing away from the piece-supporting plane;

b) picking up from the piece-supporting plane a first piece of a pair of worked pieces by means of one among the first gripping device and the second gripping device keeping the finished face or the rough face of the first piece of the pair of worked pieces facing the gripping device used to pick up the first piece;

c) moving the first piece of the pair of worked pieces towards a piece storage area by means of the first or the second, gripping device, used in step b);

d) releasing the first piece of the pair of worked pieces in the piece storage area leaving visible the finished face or the rough face;

e) picking up from the piece-supporting plane a second piece of a pair of worked pieces by one among the first gripping device and second gripping device keeping the finished face or the rough face of the second piece of the pair of worked pieces facing towards the gripping device used to pick up the second piece;

f) positioning the first gripping device and the second gripping device in an exchange position wherein the first gripping device and the second gripping device are mutually oriented such that said first and second gripping planes of the second piece of the pair of worked pieces are facing each other;

g) transferring the second piece of the pair of worked pieces from the first gripping device to the second gripping device in such a way as to orient the finished face or the rough face of the second piece of the pair of worked pieces away from the second gripping device, or transferring the second piece of the pair of worked pieces from the second gripping device to the first gripping device in such a way as to orient the finished face or the rough face of the second piece of the pair of worked pieces away from the first gripping device;

h) moving the second piece of the pair of worked pieces towards said piece storage area by means of the gripping device, first or second, which the piece is transferred to in step g);

i) releasing the second piece of the pair of worked pieces in the piece storage area by means of the gripping device, first or second, which the piece is transferred to in step g) lying the finished face or the rough face of the second piece against the visible finished face or the visible rough face of the first piece of the pair of worked pieces;

l) optionally, repeating steps a)-i) on one or more further pairs of worked pieces. Advantageously, the method according to the invention allows for an automatic arrangement of the worked pieces in the storage area by alternating the orientation of the finished face between one worked piece and an adjacent worked piece so as to position each finished face of the pieces against a finished face of an adjacent piece and each rough face of the pieces against a rough face of an adjacent piece.

In this way, it is advantageously possible to position the worked pieces in the storage area in such a way as to minimise and preferably substantially prevent possible rubbing damage to the finished face of the worked pieces.

In step a) the worked pieces are arranged with the same orientation with the finished face visible and the rough face resting on the supporting plane or, alternatively, with one finished face resting on the piece-supporting plane and one rough face facing away from the piece-supporting plane.

In steps b) to d) the first piece is picked up, moved to a storage area and released with the finished or rough face facing the gripping device used in such a way that, after release, the finished or rough face is visible.

In steps e) to i), the second piece is picked up keeping its finished face or rough face facing the gripping device that picked it up, is exchanged between the two gripping devices in such a way that, after the exchange, the rough face or finished face of the second piece is facing the gripping device that received it and the finished face or rough face is visible and, subsequently, the second piece is released in the piece storage area.

In this way, it is advantageously possible to arrange the finished face, free from gripping surfaces, against the finished face of the first piece visible in the piece storage area, or, in a similar way, to arrange the rough face, free from gripping surfaces, against the rough face of the first piece visible in the piece storage area.

In this way, the method for moving worked pieces according to the invention advantageously allows to store worked pieces avoiding that the finished face of a worked piece may be in contact with the rough face of an adjacent piece.

In the following description and in the subsequent claims, the orientation terms such as “horizontal”, “horizontally”, “vertical” and “vertically” are used to refer to the apparatus in its operating configuration with the piece-supporting plane providing a horizontal reference plane.

In particular, in the following description and in the subsequent claims the terms “vertical”, “substantially vertical”, “vertically” and “substantially vertically” are used to indicate not only an orientation that is not strictly perpendicular to a horizontal plane, but also an orientation that may deviate from such a perpendicular orientation. For example, the above terms may indicate an orientation that may deviate from the orientation perpendicular to a horizontal plane by an angle of up to about 15°.

A deviation from a perfectly perpendicular orientation may, for example, be appropriate in the piece storage area in order to properly place the worked pieces side by side and subsequently pick them up more easily.

The present invention may have, in both aspects discussed above, at least one of the preferred features described below. Such features may therefore be present individually or in combination, except where expressly stated otherwise, either in the apparatus of the first aspect of the present invention or in the method of the second aspect of the present invention.

Preferably, the piece storage area is distal from the piece-supporting plane.

In this way, it is advantageously possible to store the worked pieces in an area where pallets, containers, conveyors, loading/unloading tables or working planes of machines, on or in which the worked pieces can be placed, can be easily located, without interfering with the piece-supporting plane.

In a preferred embodiment, the apparatus according to the invention may comprise a single handling group including said first and second gripping devices.

In another preferred embodiment, the apparatus according to the invention may comprise a first handling group including said first gripping device and a second handling group including said second gripping device, said first and second handling groups being structurally independent from each other.

In this way, it is advantageously possible to have more than one configuration of the movement apparatus in order to meet the most diverse application requirements.

In a preferred embodiment, the apparatus according to the invention may comprise a supporting equipment of a single handling group including said first and second gripping devices or a first supporting equipment of said first handling group and a second supporting equipment of said second handling group.

Preferably, such a supporting equipment is configured to support a respective handling group above said piece-supporting plane.

Advantageously, the handling group(s) can operate above the piece-supporting plane and move the worked pieces in the desired manner, e.g. when the movement apparatus comprises a gantry support structure.

Preferably, the supporting equipment of said single handling group including said first and second gripping devices or the supporting equipment of one or both of said first and second handling groups is movable perpendicularly to the piece-supporting plane.

In this way, it is advantageously possible to move the gripping devices and their associated worked pieces to and from the piece-supporting plane and to and from a horizontal supporting plane in the piece storage area.

Preferably, the supporting equipment of said single handling group including said first and second gripping devices or the supporting equipment of one or both of said first and second handling groups is movable in parallel to said piece-supporting plane.

In this way, it is advantageously possible to move the gripping devices and associated worked pieces to displace the latter laterally away from the piece-supporting plane.

Preferably, the supporting equipment of said single handling group or the supporting equipment of one or both of said first and second handling groups is movable in parallel to said piece-supporting plane along directions perpendicular to each other.

By coordinating with each other the parallel and perpendicular movements with respect to the piece-supporting plane, it is advantageously possible to define a trajectory of the supporting equipment(s) between the piece-supporting plane and the piece storage area.

Preferably, the single handling group is supported by the respective supporting equipment in a rotatable manner about a vertical axis perpendicular to the piece-supporting plane.

In this way, it is advantageously possible to rotate the pieces or to rotate the handling group and the respective gripping devices to adapt to the orientation of the piece on the piece-supporting plane about this vertical axis.

In this way, it is advantageously possible to appropriately position the worked pieces to be moved or the gripping devices in relation to the latter.

Furthermore, by rotating the single handling group, it is advantageously possible to exchange the relative position of the first and second gripping devices in relation to the piece storage area.

In another preferred embodiment, one or both of said first and second structurally independent handling groups is/are rotatably supported by the supporting equipment about a vertical axis perpendicular to the piece-supporting plane.

Also in this case, it is advantageously possible to rotate the pieces about this axis or to rotate each handling group with its respective gripping device to adapt to the orientation of the piece on the piece-supporting plane.

In this way, it is advantageously possible to appropriately position the worked pieces to be moved or the gripping devices in relation to the latter.

In a preferred embodiment, the single handling group may comprise a supporting body of said first and second gripping devices configured to support said first and second gripping devices at a distance from each other along a direction parallel to the piece-supporting plane.

In another preferred embodiment, said first and second structurally independent handling groups comprise, each, a first supporting body of said first gripping device and, respectively, a second supporting body of said second gripping device, said first and second support bodies being configured to support said first and second gripping devices at a distance from each other along a direction parallel to the piece-supporting plane.

In this way, it is advantageously possible to keep the first and second gripping devices at a distance from each other, varying the distance between them where necessary, so that while one gripping device is moving a piece, the other is not in the way.

Preferably, the supporting body of the single handling group, or the supporting body of each of said structurally independent first and second handling groups, is associated to a lower end of the respective supporting equipment.

In this way, it is advantageously possible to move the handling group(s) above the piece-supporting plane and move the worked pieces in the desired manner, for example when the movement apparatus comprises one or more gantry support structures.

In a preferred embodiment, the movement apparatus according to the invention comprises a first actuator device configured to move the first gripping device along a direction perpendicular to the piece-supporting plane and relatively to said supporting body of the single handling group or of the first handling group.

In this way, it is advantageously possible to move the first gripping device to and from the piece-supporting plane independently of the second gripping device, for example when removing a piece from the piece-supporting plane or when laying a piece in the piece storage area.

In a preferred embodiment, the movement apparatus according to the invention comprises a second actuator device configured to move the second gripping device along a direction perpendicular to the piece-supporting plane and relatively to the supporting body of the single handling group or of the second handling group.

In this way, it is advantageously possible to move the second gripping device to and from the piece-supporting plane independently from the first gripping device, e.g. when removing a piece from the piece-supporting plane or when laying a piece in the piece storage area.

In a preferred embodiment, the first gripping device may be rigidly fixed to said supporting body of the single handling group, or of the first handling group, by a respective first vertically extending supporting arm.

In this way, it is advantageously possible to move the first gripping device together with the supporting body by means of the aforementioned supporting equipment of the single handling group or of the first handling group.

In another preferred embodiment, the first gripping device may be movably associated to said supporting body of the single handling group or of the first handling group by means of a respective first vertically extending supporting arm.

In this way, it is advantageously possible to move the first gripping device also in relation to the respective supporting body in both horizontal and vertical directions by providing appropriate actuator devices of the first vertically extending supporting arm.

And, this, irrespective of the movement of the supporting equipment of the single handling group or of the first handling group. For example, the first vertically extending supporting arm of the first gripping device can be slidingly mounted on the supporting body along a horizontal direction and/or along a vertical direction.

Advantageously, the first vertically extending supporting arm also allows to space apart the first gripping device and the supporting body along a vertical direction so that the pieces held by the first gripping device can be kept at a distance from the supporting body during their movement.

In a further preferred embodiment, the first gripping device may be movably associated to said supporting body of the single handling group by means of a respective first supporting arm comprising a respective horizontally extending portion and a respective vertically extending portion.

Thanks to this further preferred configuration, and as it will be better apparent in the following, it is advantageously possible to move the first gripping device with respect to the supporting body of the single handling group by moving the first supporting arm away from or towards the supporting body according to specific application requirements.

According to this preferred configuration, it is advantageously possible to reduce the transversal hindrance of the single handling group comprising the first gripping device by providing in the supporting body of said single handling group an area for accommodating the horizontally extending portion of the first supporting arm as will be described in more detail below.

The horizontally extending portion of the first supporting arm also provides a horizontal spacing between the first gripping device and the second gripping device.

The vertically extending portion of the first supporting arm provides a vertical spacing between the first gripping device and the supporting body of the single handling group.

In a preferred embodiment, the movement apparatus according to the invention may comprise a third actuator device active on the first supporting arm of the first gripping device and configured to move the first gripping device in parallel to the piece-supporting plane by sliding the first supporting arm on or in the supporting body of the single handling group.

According to this preferred configuration, it is advantageously possible to move the first supporting arm and the first gripping device associated thereto along a horizontal direction by suitably varying its positioning relative to the second gripping device during the movement operations performed in the workspace of the apparatus according to the invention.

In an alternative preferred embodiment, the movement apparatus according to the invention may comprise a third actuator device active on the first supporting arm of the first gripping device and configured to move said first supporting arm and said first gripping device in parallel to the piece-supporting plane and towards and away from said supporting body of the single handling group.

According to this further preferred configuration, it is advantageously possible to move the first supporting arm and the first gripping device associated thereto along a horizontal direction by suitably varying its positioning both relative to the second gripping device, and to the supporting body of the single handling group during the movement operations performed in the workspace of the apparatus according to the invention.

In both the above preferred configurations, the first gripping device can thus approach the second gripping device to reach the exchange position and move away from the second gripping device after the worked piece has been transferred.

In preferred embodiments of the apparatus according to the invention, the above-described configurations can also be applied to the second gripping device and its supporting and movement elements, achieving the advantageous technical effects described above.

Thus, in a preferred embodiment in which two structurally independent handling groups are provided, the second gripping device may be rigidly fixed to the supporting body of the second handling group by means of a respective second vertically extending supporting arm.

In this way, it is advantageously possible to move the second gripping device together with the respective supporting body by means of the second supporting equipment of the second handling group.

In this case, the distance between the first and the second gripping device can be adjusted by adjusting the distance between the first and the second handling group.

In another preferred embodiment, the second gripping device may be movably associated to said supporting body of the single handling group or of the second handling group by means of a respective second vertically extending supporting arm.

In this way, it is advantageously possible to move the second gripping device also with respect to the supporting body of the single or second handling group along both horizontal and vertical directions by providing appropriate actuator devices for the second vertically extending supporting arm.

For example, the second vertically extending supporting arm of the second gripping device can be slidingly mounted on the supporting body along a horizontal direction and/or along a vertical direction.

Advantageously, the second vertically extending supporting arm also allows to space apart the second gripping device and the supporting body along a vertical direction so that the pieces held by the second gripping device can be kept at a distance from the supporting body of the single handling group during their movement.

In a further preferred embodiment, the second gripping device is movably associated to said supporting body of the single handling group by means of a respective second supporting arm comprising a respective horizontally extending portion and a respective vertically extending portion.

Thanks to this further preferred configuration, and as it will be better apparent in the following, it is advantageously possible to move the second gripping device with respect to the supporting body of the individual handling group by moving the second supporting arm away from or towards the supporting body according to specific application requirements.

According to this preferred configuration and as illustrated above, it is advantageously possible to reduce the transversal hindrance of the single handling group comprising the second gripping device by providing in the supporting body of the single handling group an area for accommodating the horizontally extending portion of the second supporting arm as will be described in more detail below.

This horizontally extending portion also provides a horizontal spacing between the second gripping device and the first gripping device.

The vertically extending portion provides a vertical spacing between the second gripping device and the supporting body of the single handling group.

In an alternative preferred embodiment, the movement apparatus according to the invention may comprise a fourth actuator device active on the second supporting arm of the second gripping device and configured to move the second gripping device in parallel to said piece-supporting plane by sliding the second supporting arm on or in the supporting body of the single handling group.

According to this preferred configuration, it is advantageously possible to move the second supporting arm and the second gripping device associated thereto along a horizontal direction by suitably varying its positioning with respect to the first gripping device during the movement operations performed in the workspace of the apparatus according to the invention.

In an alternative preferred embodiment, the movement apparatus according to the invention may comprise a fourth actuator device active on the second supporting arm of the second gripping device and configured to move said second supporting arm and said second gripping device in parallel to said piece-supporting plane and towards and away from said supporting body of the single handling group.

According to this further preferred configuration, it is advantageously possible to move the second supporting arm and the second gripping device associated thereto along a horizontal direction by suitably varying its positioning both with respect to the first gripping device, and with respect to the supporting body of the single handling group during the movement operations performed in the workspace of the apparatus according to the invention.

In both the above preferred configurations, the second gripping device can thus approach the first gripping device to reach the exchange position and move away from the first gripping device after the worked piece has been transferred.

In a preferred embodiment, the first gripping device and the second gripping device are movably associated to said supporting body of the single handling group on opposite sides thereof.

In this way, it is advantageously possible to have a symmetrical arrangement of masses with respect to the supporting body of the single handling group with the corresponding benefits in terms of balance of the moving parts of the apparatus rotating about the vertical axis.

In a preferred embodiment, in the supporting body of the single handling group a housing zone is defined of the horizontally extending portion of the first supporting arm of the first gripping device.

Advantageously, this preferred configuration allows both to reduce the lateral hindrance of the single handling group and to guide the sliding of the horizontally extending portion of the first supporting arm in the supporting body during the movement towards and away from the latter.

Preferably, the third actuator device is configured to respectively insert and extract the horizontally extending portion of the first supporting arm of the first gripping device into and out of said housing zone.

In a preferred embodiment, the housing zone of the horizontally extending portion of the first supporting arm of the first gripping device is defined in a substantially hollow box-shaped portion of the supporting body of the single handling group.

In preferred embodiments of the apparatus according to the invention, the above-described configurations of the supporting body of the single handling group can also be applied to the second gripping device and to the respective supporting arm, achieving the advantageous technical effects described above.

Thus, in a preferred embodiment, in the supporting body of the single handling group a housing zone is defined of the horizontally extending portion of the second supporting arm of the second gripping device.

Similarly to what has been illustrated above in relation to the supporting arm of the first gripping device, this preferred configuration advantageously allows both to reduce the lateral hindrance of the single handling group and to guide the sliding of the horizontally extending portion of the second supporting arm in the supporting body during the movement towards and away from the latter.

Preferably, the fourth actuator device is configured to insert and respectively extract the horizontally extending portion of the second supporting arm of the second gripping device into and out of said housing zone.

Preferably, said housing zone of the horizontally extending portion of the second supporting arm of the second gripping device is defined in the substantially hollow box-shaped portion of the supporting body of the single handling group.

Thanks to the presence of the aforementioned housing zone of the horizontally extending portion of the first and/or second supporting arm of the first and/or second gripping device, it is advantageously possible to drastically reduce both the masses involved and the mechanical moment that develops during the rotation of the single handling group about the vertical axis.

In this preferred configuration, the movement apparatus according to the present invention also achieves the further advantage of having a greater flexibility of use since the extreme compactness and reduced lateral hindrance of the single handling group—related to the possibility of partially or totally inserting the horizontally extending portion of the first and/or of the second supporting arm of the first and/or second gripping device in the housing zone defined in the supporting body of the single handling group—allows a rotation of the single handling group also in the peripheral areas of the operating zone of the movement apparatus.

In a preferred embodiment, the third actuator device is configured to move the horizontally extending portion of the first supporting arm of the first gripping device along a direction substantially parallel to the piece-supporting plane between:

- a first insertion position wherein the horizontally extending portion of the first supporting arm of the first gripping device is substantially completely housed in said housing zone defined in the supporting body of the single handling group; and
- a second extraction position wherein the horizontally extending portion of the first supporting arm of the first gripping device is at least partially extending in a cantilevered fashion externally to the supporting body of the single handling group.

In a preferred embodiment, the fourth actuator device is configured to move the horizontally extending portion of the second supporting arm of the second gripping device along a direction substantially parallel to the piece-supporting plane between:

- a first insertion position wherein the horizontally extending portion of the second supporting arm of the second gripping device is substantially completely housed in said housing zone defined in the supporting body of the single handling group; and
- a second extraction position wherein the horizontally extending portion of the second supporting arm of the second gripping device is at least partially extending in a cantilevered fashion externally to the supporting body of the single handling group.

In this way, it is advantageously possible to insert/extract the horizontally extending portion of the supporting arms of the first and/or of the second gripping device into/from the supporting body of the single handling group with a guided sliding substantially of a drawer-like type achieving a high compactness of the single handling group in any configuration, of insertion, partial extraction or total extraction, of the horizontally extending portion of the supporting arm(s).

Preferably, the horizontally extending portion of the first supporting arm of the first gripping device and/or the horizontally extending portion of the second supporting arm of the second gripping device comprises one or more rod-shaped elements, preferably parallel to each other.

Preferably, the rod-shaped element(s) is/are slidably mounted in the housing zone defined in the supporting body of the single handling group.

Preferably, the horizontally extending portion of the first supporting arm of the first gripping device and the horizontally extending portion of the second supporting arm of the second gripping device comprise a plurality of rod-shaped elements, preferably parallel to each other, slidably mounted in said housing zone defined in the supporting body of the single handling group.

In this way, it is advantageously possible to precisely position the first and/or the second gripping device using a structure of the respective supporting arms that is suitably rigid but at the same time of low weight and low cost.

In addition, the housing zone defined in the supporting body of the single handling group can in this way effectively and simultaneously house and guide both the horizontally extending portion of the first supporting arm and the horizontally extending portion of the second supporting arm.

Preferably, the rod-shaped elements of the horizontally extending portion of the first supporting arm of the first gripping device and of the horizontally extending portion of the second supporting arm of the second gripping device penetrate are at least partially interpenetrating in said housing zone defined in the supporting body of the single handling group.

In this way, it is advantageously possible to reduce as much as possible the size of the housing zone of the horizontally extending portion of the supporting arms of the first and of the second gripping device defined in the supporting body of the single handling group.

Thus, for example, this housing zone can be sized so as to have the smallest possible transversal dimension, essentially equal to the length of the horizontally extending portion of the supporting arms of the first and of the second gripping devices.

In a preferred embodiment, the horizontally extending portion of the first supporting arm of the first gripping device and/or the horizontally extending portion of the second supporting arm of the second gripping device may be substantially of telescopic type.

Also in this case, it is advantageously possible to reduce as much as possible the transversal dimensions of the single handling group and to achieve an increased operating flexibility of the movement apparatus of the invention by extending or retracting the horizontally extending portion of the first and/or of the second supporting arms of the gripping devices.

In a further preferred embodiment, the horizontally extending portion of the first supporting arm of the first gripping device and/or the horizontally extending portion of the second supporting arm of the second gripping device may be slidably supported outside of the supporting body of the handling group.

Also in this case, it is advantageously possible to reduce as much as possible the transversal dimensions of the handling group and to achieve an increased operating flexibility of the movement apparatus of the invention.

Preferably, the first gripping device and the second gripping device are hinged to the respective first or second vertically extending supporting arm or to the vertically extending portion of the first supporting arm and, respectively, of the second supporting arm, at a free end of the first supporting arm or of the second supporting arm or at a free end of the vertically extending portion of the first supporting arm and, respectively, of the second supporting arm.

In this way, the first and second gripping devices can rotate with respect to their respective supporting arms to change their respective inclination with respect to the latter and to the piece-supporting plane.

In a preferred embodiment, the movement apparatus of the invention may comprise:

a fifth actuator device configured to rotate the first gripping device about a first horizontal axis substantially parallel to the piece-supporting plane; and/or a sixth actuator device configured to rotate the second gripping device about a horizontal axis substantially parallel to the piece-supporting plane.

Advantageously, the fifth and/or the sixth actuator device carry out rotational movements of the first and/or of the second gripping device with respect to their respective supporting arms about horizontal axes.

This allows the first and/or second gripping device to be oriented:

i) in parallel to the piece-supporting plane in the pick-up position, ii) facing each other in the exchange position and according to the desired orientation, and iii) in the laying position so as to release the worked piece with the desired orientation, e.g. horizontal or substantially vertical in the piece storage area.

Preferably, said fifth actuator device and said sixth actuator device are configured to rotate said first gripping device and said second gripping device of an angle equal to at least 90° about said horizontal axis substantially parallel to said piece-supporting plane. In this way, it is possible to rotate the respective gripping planes between a configuration that is essentially parallel to the piece-supporting plane, for example in the pick-up position, and a configuration that is essentially perpendicular to the piece-supporting plane, for example in the exchange position.

In a preferred embodiment, the movement apparatus of the invention comprises:

a seventh actuator device configured to rotate the first gripping device about a vertical axis substantially perpendicular to the piece-supporting plane; and/or an eighth actuator device configured to rotate the second gripping device about a vertical axis substantially perpendicular to the piece-supporting plane.

In this way, it is advantageously possible:

i) to rotate the worked pieces picked up in the horizontal plane and horizontally oriented without changing the reciprocal position of the first and of the second gripping devices, and ii) to change the mutual position of the first and of the second gripping device when at least one of them is not horizontally oriented, e.g. when at least one of them is substantially vertically oriented.

In a preferred embodiment, said first gripping device and/or said second gripping device comprise respective gripping elements of the pneumatic-type comprising one or more suction elements.

The gripping elements of the pneumatic-type allow to effectively retain a worked piece, regardless of the type of material of which it is made, by approaching the respective gripping surface to one face of the piece.

In further preferred embodiments, said first gripping device and/or said second gripping device may comprise respective gripping elements of the magnetic type which may be usefully employed for moving pieces made of ferromagnetic material, or gripping elements of the mechanical type which may be usefully employed for moving pieces irrespective of the type of material of which they are made. For example, gripping elements of the mechanical type may be of the jaw type comprising at least one clamping element movable towards and away from a fixed supporting member or two clamping elements movable with respect to each other.

In a preferred embodiment of the movement method of the invention, step b) of picking up the first piece of the pair of worked pieces and/or step e) of picking up the second piece of the pair of worked pieces by means of one among the first gripping device and the second gripping device comprises:

moving a supporting body of the single handling group towards the piece-supporting plane; and/or moving one among the first gripping device and the second gripping device towards the piece-supporting plane relatively to the supporting body of the single handling group;

operating the first gripping device or the second gripping device to associate the first piece or the second piece of the pair of worked pieces to the first gripping device or to the second gripping device.

Preferably, said step b) of picking up from the piece-supporting plane the first piece of the pair of worked pieces and/or said step e) of picking up from the piece-supporting plane the second piece of the pair of worked pieces by means of one among the first gripping device and the second gripping device comprises:

moving a supporting body of the first handling group or of the second handling group towards the piece-supporting plane; and/or moving one among the first gripping device and the second gripping device towards the piece-supporting plane relatively to a respective supporting body of the first or the second handling group;

operating the first gripping device or the second gripping device to associate the first piece or the second piece of the pair of worked pieces to the first gripping device or to the second gripping device.

In a preferred embodiment of the movement method of the invention, step f) of positioning the first gripping device and the second gripping device in the exchange position comprises rotating the first gripping device and the second gripping device so as to arrange said first and second gripping planes of the picked up piece of the pair of worked pieces in a mutually facing position.

In this way, it is advantageously possible to orientate the worked piece according to a transfer orientation that allows the exchange of the worked piece between the first gripping device and the second gripping device.

This transfer orientation is preferably inclined at an angle of approximately 90° to the piece-supporting plane, or can assume different inclinations with respect to the piece-supporting plane, if desired, as long as they allow the exchange of the worked piece between the first gripping device and the second gripping device.

In a preferred embodiment of the movement method of the invention, step f) of positioning the first gripping device and the second gripping device in the exchange position comprises moving the first gripping device and the second gripping device away from each other before rotating the first gripping device and the second gripping device.

In this way, it is advantageously possible to adequately distance the first and the second gripping devices from each other before carrying out the aforementioned rotation of the gripping devices.

In a preferred embodiment of the movement method of the invention, step g) of transferring the second piece of the pair of worked pieces from the first gripping device to the second gripping device, or vice versa, comprises activating the second gripping device and deactivating the first gripping device, or vice versa.

Preferably, the gripping device that receives the worked piece is activated before the gripping device that releases the worked piece is deactivated.

In this way, the worked piece can be released from the first gripping device at its finished face and retained by the second gripping device at its rough face, or vice versa.

In a preferred embodiment of the movement method of the invention, step h) of moving the second worked piece of the pair of worked pieces towards said piece storage area comprises rotating the second gripping device to orient the respective second gripping plane and the finished face or the rough face of the second worked piece of the pair of worked pieces in a position parallel to the piece-supporting plane or in a position facing away from the first gripping plane.

In another preferred embodiment, said step h) of moving the second worked piece of the pair of worked pieces towards said piece storage area comprises rotating the first gripping device to orient the respective first gripping plane and the finished face or the rough face of the second worked piece of the pair of worked pieces in a position parallel to the piece-supporting plane or in a position facing away from the second gripping plane.

In both these preferred embodiments, the second worked piece is thus reoriented from the aforementioned transfer orientation, at which the second worked piece is transferred from one gripping device to another, to a laying orientation, suitable for laying the second worked piece.

Moreover, in both these preferred embodiments, the second worked piece is simultaneously moved away from the gripping device that originally picked it up.

Preferably, said step h) comprises rotating the second gripping device or the first gripping device of an angle equal to 90° or 180° about a vertical axis or about a horizontal axis.

In particular, rotating the gripping device receiving the second worked piece subsequent to the transfer of an angle of 90° about a horizontal axis is adapted to reorient the second worked piece from a vertical transfer orientation to a horizontal laying orientation.

Rotating the gripping device receiving the second worked piece subsequent to the transfer of an angle of 180° about a horizontal or vertical axis is adapted to reorient the second worked piece from a vertical transfer orientation to a vertical laying orientation facing the opposite side.

Preferably said step h) of moving the second piece of the pair of worked pieces towards said piece storage area comprises rotating the second gripping device or the first gripping device about a horizontal rotation axis to orient the finished face or the rough face of the second piece of the pair of worked pieces such that said finished face or rough face is facing the visible finished face or the visible rough face of the first piece of the pair of worked pieces previously released in the piece storage area.

In this way, it is advantageously possible to stack the worked pieces both horizontally and vertically, preventing undesirable possible damages to the finished faces of the pieces, which are facing and abutting each other in the piece storage area.

Preferably, said step h) comprises rotating the second gripping device or the first gripping device of an angle equal to 90° about a horizontal axis.

Preferably, said step h) of moving the second worked piece of the pair of worked pieces towards said piece storage area comprises moving the second gripping device and the first gripping device away from each other before rotating the second gripping device or the first gripping device.

In this way, it is advantageously possible to prevent a possible contact between the second worked piece and the gripping device that released the second worked piece during the transfer of the latter.

Preferably, said step d) of releasing the first piece of the pair of worked pieces comprises de-activating the second gripping device or the first gripping device after having released the first worked piece of the pair of pieces in the piece storage area.

Preferably, said step i) of releasing the second piece of the pair of worked pieces in the worked piece storage area comprises de-activating the second gripping device or the first gripping device after having laid said second worked piece on said first worked piece of the pair of worked pieces in the piece storage area.

BRIEF DESCRIPTION OF THE FIGURES

Additional characteristics and advantages of the present invention will be better apparent from the following detailed description of one of the preferred embodiments thereof, made with reference to the attached drawings and provided by way of indicative and non-limiting example, in which.

DETAILED DESCRIPTION OF THE CURRENTLY PREFERRED EMBODIMENTS OF THE INVENTION

In the attached figures, an apparatus for moving worked pieces according to the present invention is generally indicated by the numerical reference 1 and hereinafter referred to by the abbreviated notation of "apparatus 1".

The apparatus 1 is described with reference to a reference system, illustrated in the attached FIGS. 1A-6B, comprising an X axis, a Y axis perpendicular to the X axis and a Z axis perpendicular to the X and Y axes, wherein the X and Y axes define a horizontal plane and the Z axis defines a vertical direction.

The apparatus 1 comprises a horizontal piece-supporting plane 5, which may receive worked pieces P from a processing machine of a material in block or slab form, for example stone material, or from a production line in which one or more processing machines are active, for example one or more cutting, milling and/or polishing machines of the material.

Figure 1A:
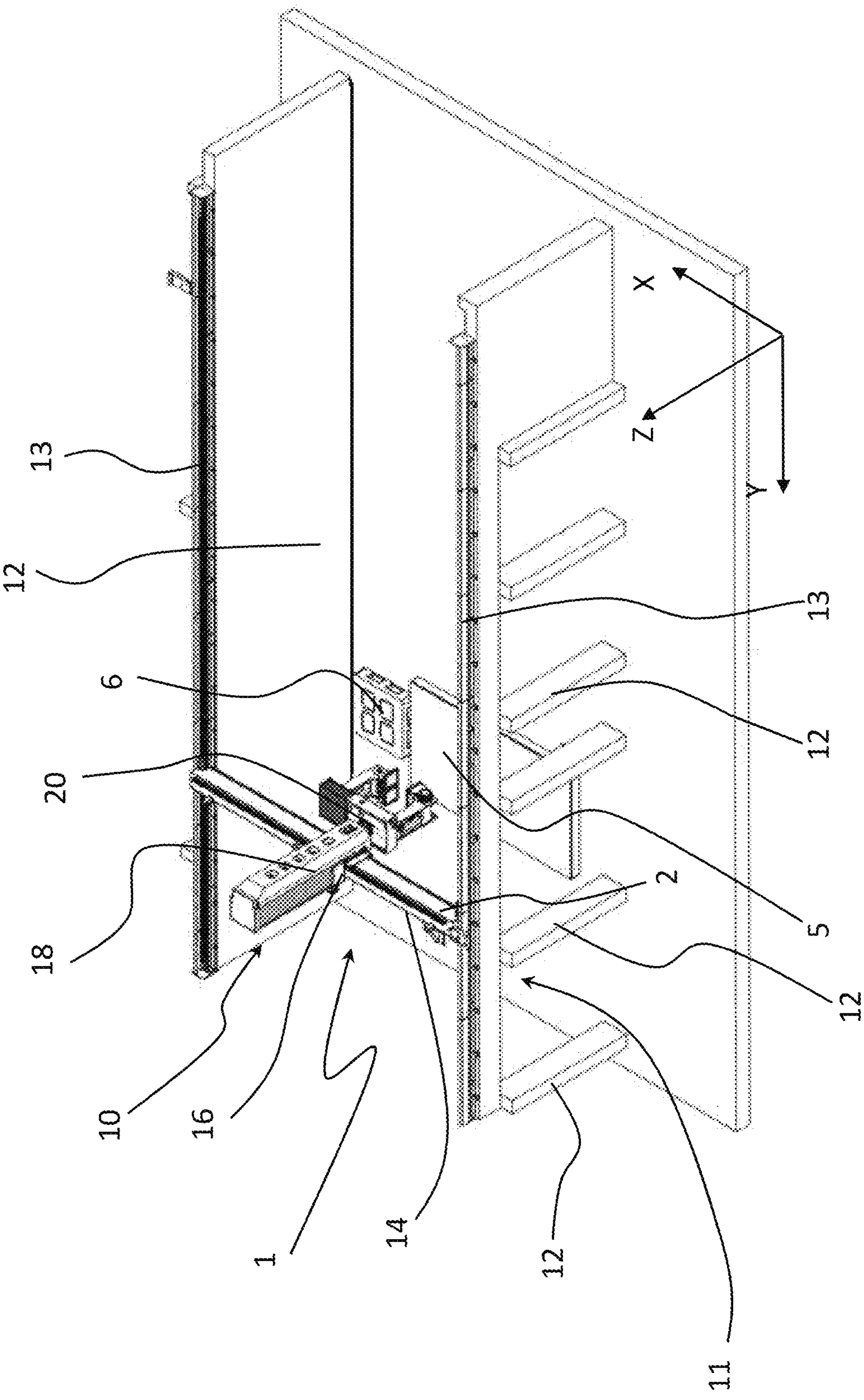
FIG. 1A is a perspective view of a first preferred embodiment of an apparatus for moving worked pieces according to the present invention.

In the preferred embodiment illustrated in FIG. 1A, the piece-supporting plane 5 may be configured to receive worked pieces from a conveyor, not illustrated, that moves the pieces along a production worked piece processing line, also not illustrated.

Figure 1B:
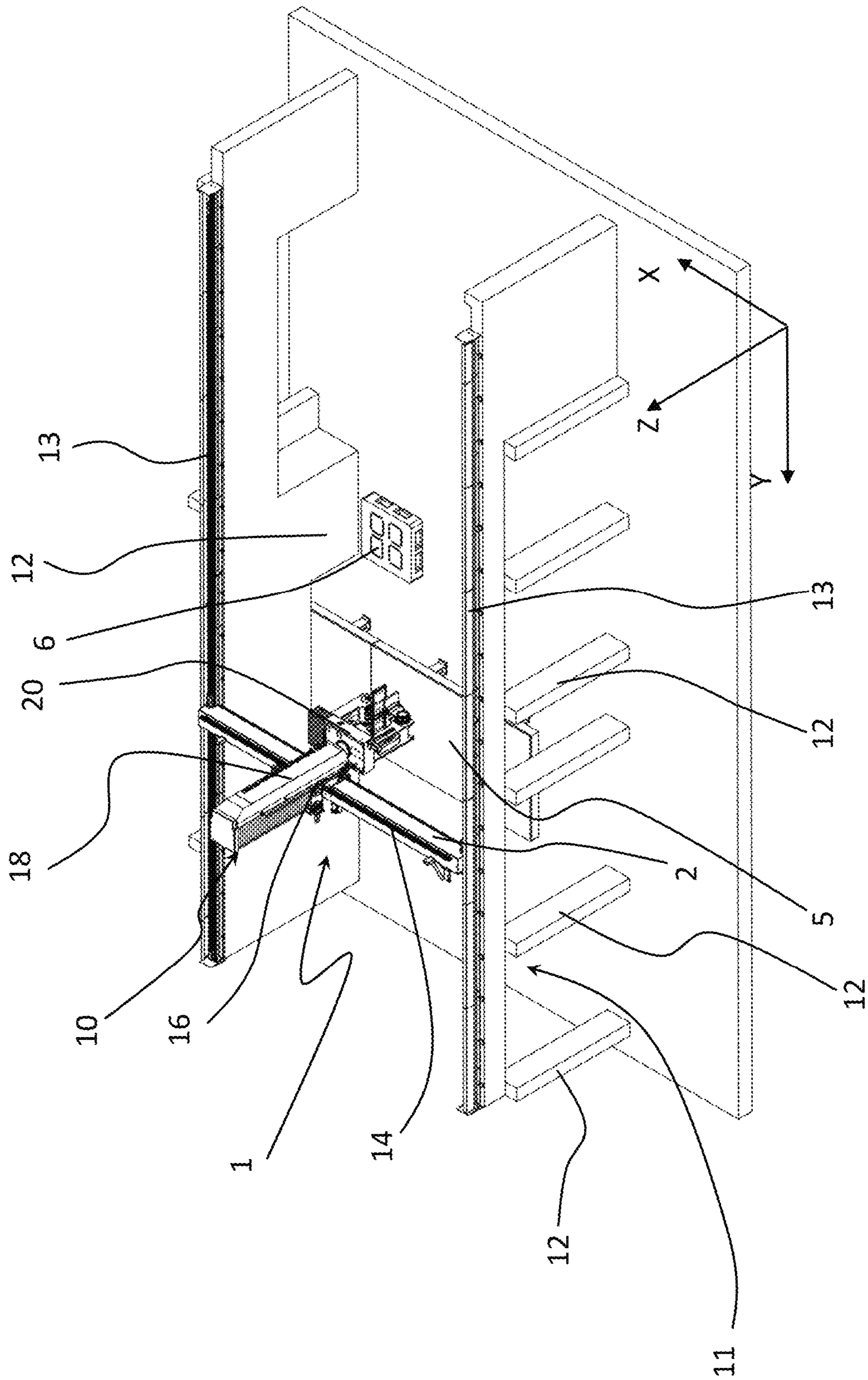
FIG. 1B is a perspective view of a second preferred embodiment of an apparatus for moving worked pieces according to the present invention.

In the preferred embodiment illustrated in FIG. 1B, the piece-supporting plane 5 may, for example, comprise the end of a conveyor that moves the pieces along the worked production line for machining the pieces, not illustrated.

The apparatus 1 is configured to move the worked pieces and place them in a piece storage area 6, for example positioned at a given distance from the piece-supporting plane 5.

The piece storage area 6 is defined in or by a support adapted to receive the pieces P, such as a pallet, a container, a floor, a conveyor or a working plane of a machine.

The apparatus 1 comprises a handling group 20 of the worked pieces supported above the piece-supporting plane 5 by a respective supporting equipment 10 configured to operate above the piece-supporting plane 5 and the piece storage area 6 and movable orthogonally to the piece-supporting plane 5.

In the preferred embodiments illustrated, the apparatus 1 comprises a gantry structure 11 within which the piece-supporting plane 5 and the piece storage area 6 are preferably positioned.

In the preferred embodiments illustrated by way of example only, the gantry structure 11 comprises a plurality of vertical support structures or shoulders 12 and a pair of longitudinal guides 13, parallel to the Y axis and maintained in a raised position with respect to the piece-supporting plane 5 by the vertical support structures 12.

A crossbeam 2 parallel to the X axis extends between the longitudinal guides 13 and is movable along them in a longitudinal direction parallel to the Y axis.

The crossbeam 2 comprises a transversal guide 14 which is also held in a raised position with respect to the piece-supporting plane 5 by the vertical support structures 12.

Figure 2:
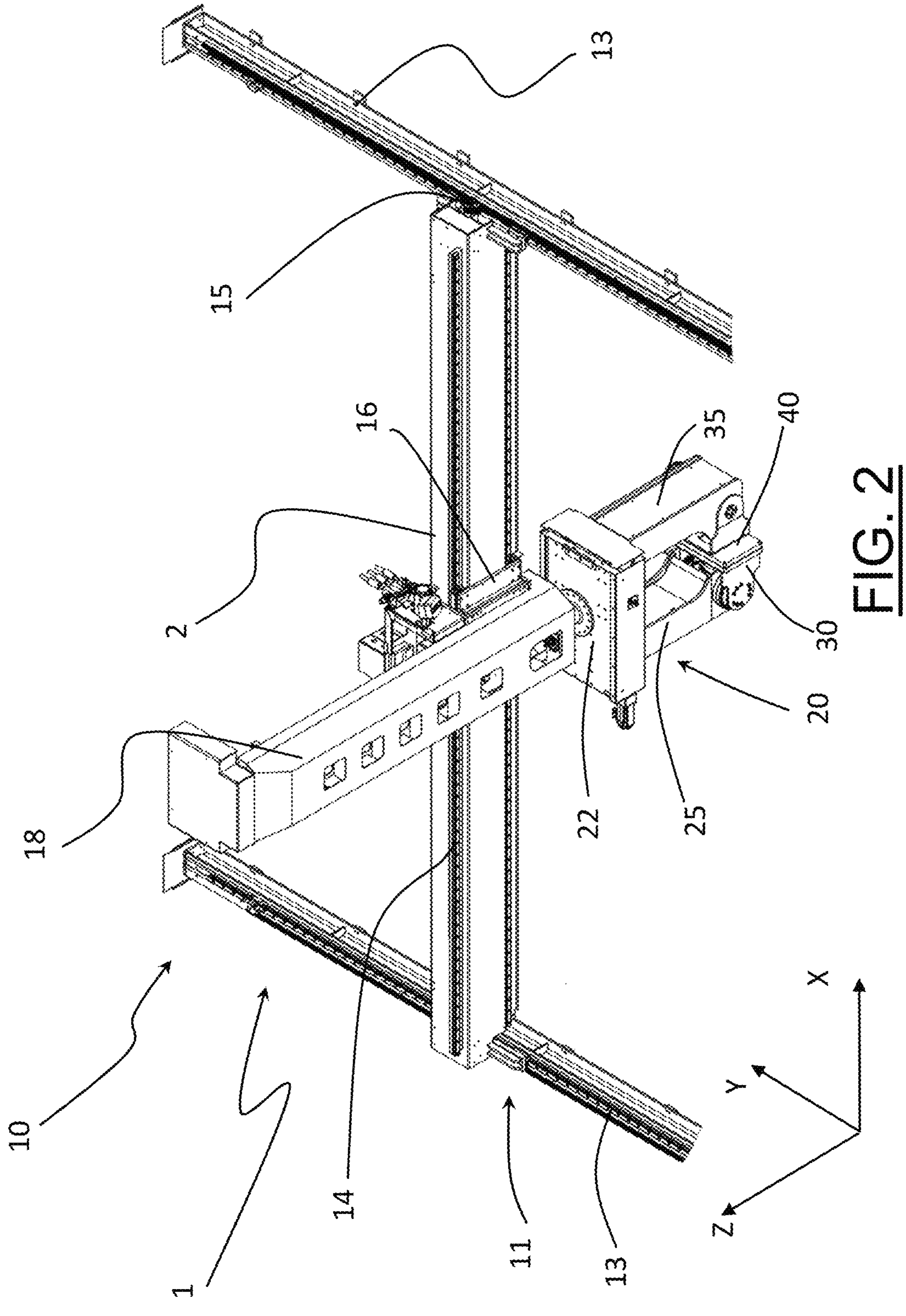
FIG. 2 is a perspective view of a detail of the apparatus in FIGS. 1A and 1B, with some elements removed to highlight others.

An actuator device 15 drives the movement of the crossbeam 2 and the transversal guide 14 associated thereto with respect to the vertical support structures 12 and the longitudinal guides 13 associated thereto, for example by means of a pinion-rack coupling (see FIG. 2).

Preferably, the supporting equipment 10 comprises a slide 16, slidably mounted on the transversal guide 14 and movable on the crossbeam 2 along a transversal direction parallel to the X axis.

The movement of the slide 16 along the transversal guide 14 takes place by the action of an actuator device 17, for example by means of a pinion-rack coupling.

Figure 3:
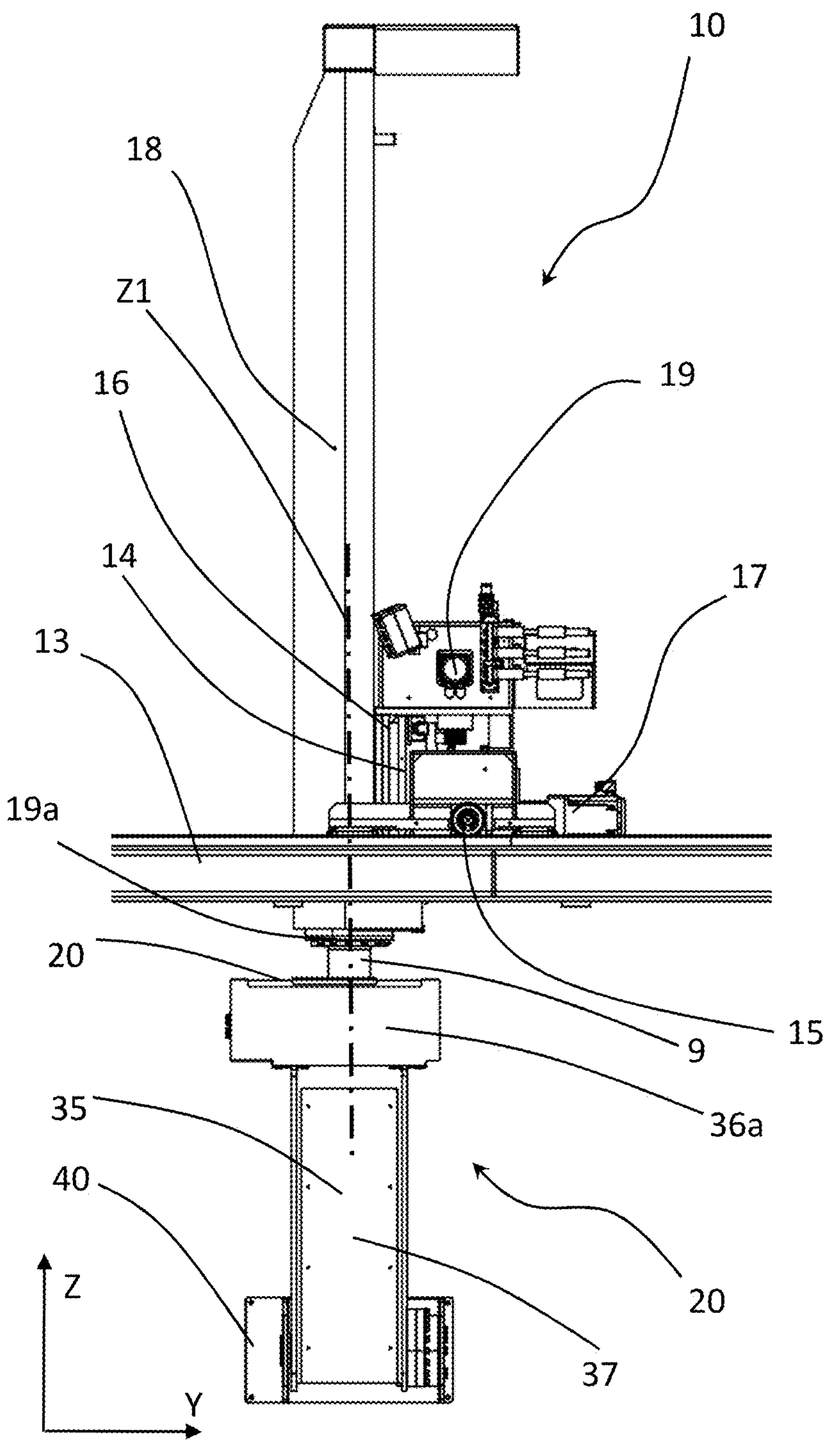
FIG. 3 is a side view of a detail of the apparatus of FIGS. 1A and 1B, with some elements removed to highlight others.

Preferably, the supporting equipment 10 comprises a support member 18 connected to the slide 16 and vertically movable with respect to the slide 16 itself along a vertical axis Z1, perpendicular to the piece-supporting plane 5, moving towards and away from the piece-supporting plane 5 (see FIG. 3).

The vertical movement of the supporting equipment 10 with respect to the slide 16 takes place by the action of an actuator device 19, for example by means of a linear actuator, for example of the recirculating ball type (see FIG. 3).

In the preferred embodiments illustrated, the handling group 20 is arranged below the supporting equipment 10 and is rotatably connected to a lower end 19*a* of the supporting equipment 10 by means of a shaft 9 (see FIG. 3).

Preferably, the handling group 20 is rotatable with respect to the supporting equipment 10 about the vertical axis Z1.

Figure 4:
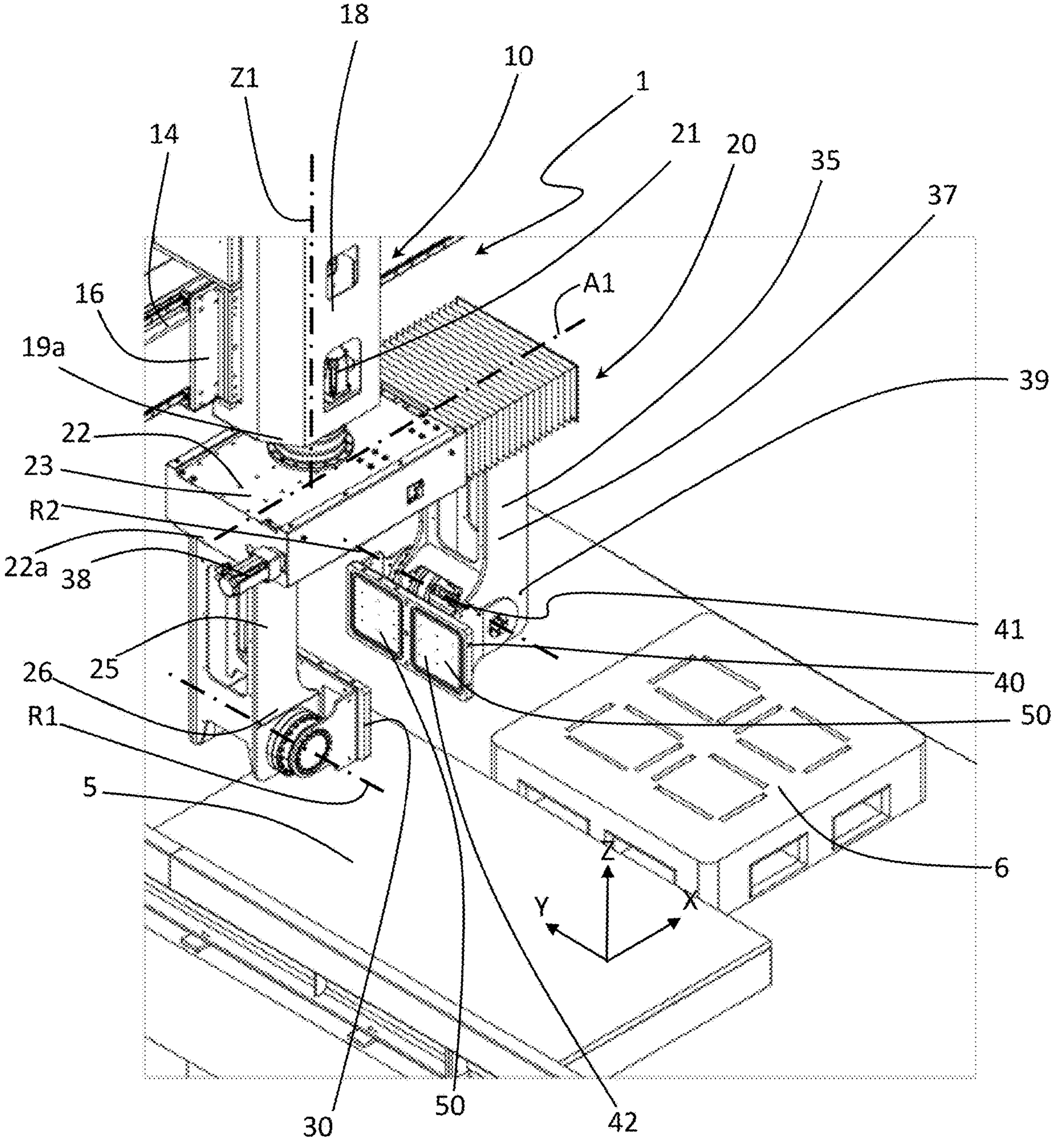
FIG. 4 is a perspective view of some details of the apparatus in FIG. 1A.

Preferably, the rotation of the handling group 20 about the vertical axis Z1 is operated by an actuator device 21 associated with the supporting equipment 10, for example mounted on the support member 18, and active on the rotational drive shaft 9 of the handling group 20 (see FIG. 4).

Preferably, the handling group 20 comprises a supporting body 22 preferably extending in a direction parallel to the piece-supporting plane 5, i.e. parallel to the plane indicated by the X and Y axes.

Preferably, the supporting body 22 comprises a substantially hollow box-shaped portion 23 defining a housing zone 24.

In the preferred embodiments illustrated, a first supporting arm 25 is rigidly connected at a first transversal end 22*a* of the supporting body 22.

Preferably, the first supporting arm 25 vertically extends below the supporting body 22.

In the preferred embodiments illustrated, the apparatus 1 comprises a first gripping device 30 of the pieces hinged at a lower end 26 of the first supporting arm 25 so as to rotate about a first horizontal axis R1 (see FIG. 4).

Figure 5:
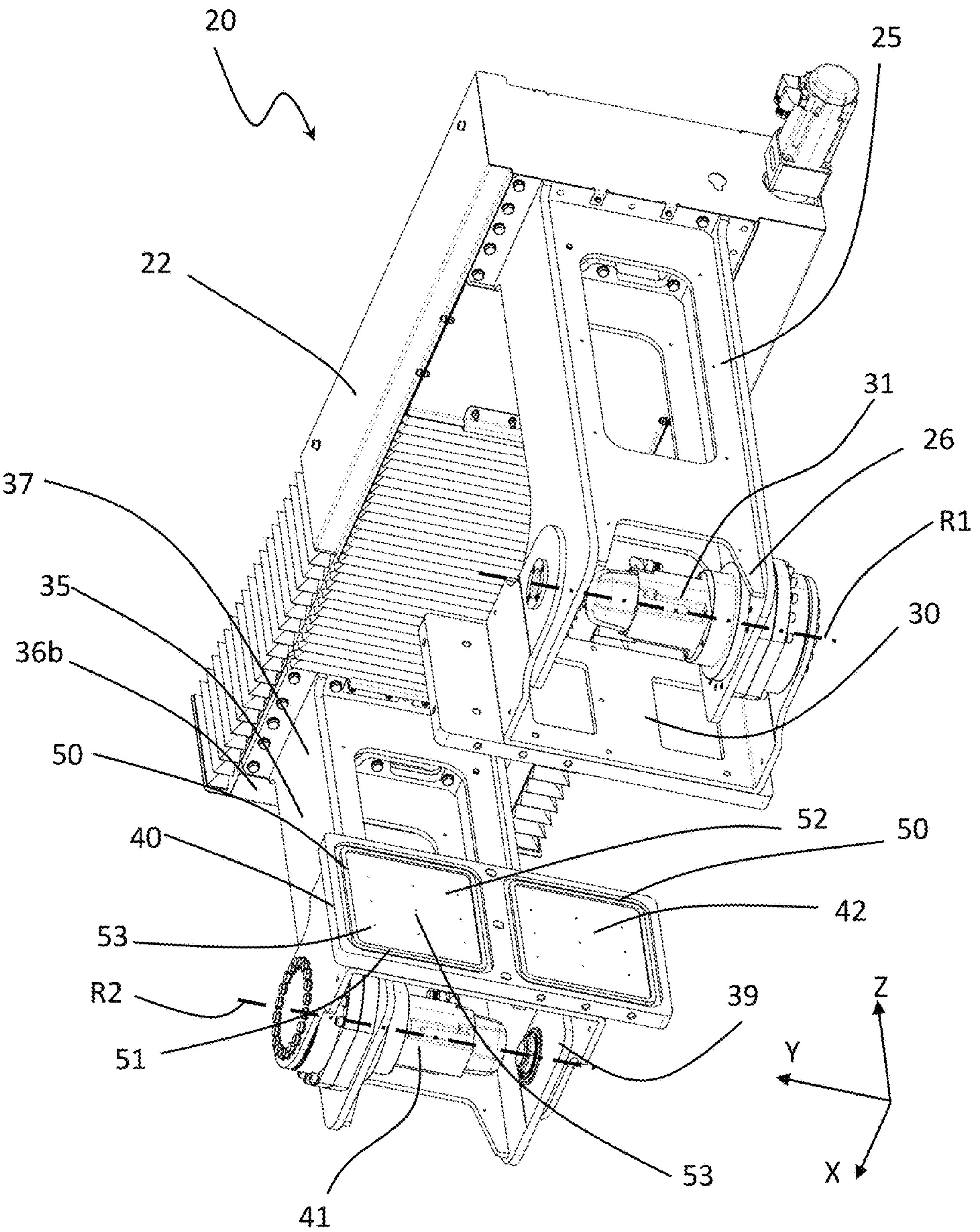
FIG. 5 is a perspective view from below of a handling group of the apparatus of FIGS. 1A and 1B.

Preferably, the rotation of the first gripping device 30 with respect to the first supporting arm 25 and about the first horizontal axis R1 is operated by an actuator device 31, preferably mounted at the lower end 26 of the first supporting arm 25 (see FIGS. 4 and 5).

In the preferred embodiments illustrated, the first gripping device 30 is rotatable about the first horizontal axis R1 between:

- a horizontal configuration—shown in FIGS. 7A-7F, 8A-8D and 8H-8I—parallel to the piece-supporting plane 5,
- a first vertical configuration, illustrated in FIGS. 4, 5, 7G-7L, 8E-8G and 8J-8O, perpendicular to the piece-supporting plane 5 and oriented at 90° with respect to the horizontal configuration, and
- a second vertical configuration—not illustrated—perpendicular to the piece-supporting plane 5, oriented at 90° with respect to the horizontal configuration and rotated of 180° about the first horizontal axis R1 with respect to the first vertical configuration.

The first gripping device 30 comprises a gripping face 32 defining a first gripping plane of a worked piece P.

Preferably, the gripping face 32 is configured to be placed in contact with a face of a worked piece P to exert a retaining action of the first gripping device 30 on the piece itself.

The handling group 20 further comprises a second supporting arm 35.

In the preferred embodiment illustrated, the second supporting arm 35 is substantially L-shaped and comprises a horizontally extending portion 36 (better shown in FIGS. 6A and 7E) and a vertically extending portion 37, defining as many portions of the L.

Preferably, the horizontally extending portion 36 of the second supporting arm 35 is at least partially housed in the housing zone 24 defined in the supporting body 22 of the handling group 20.

Figure 6:
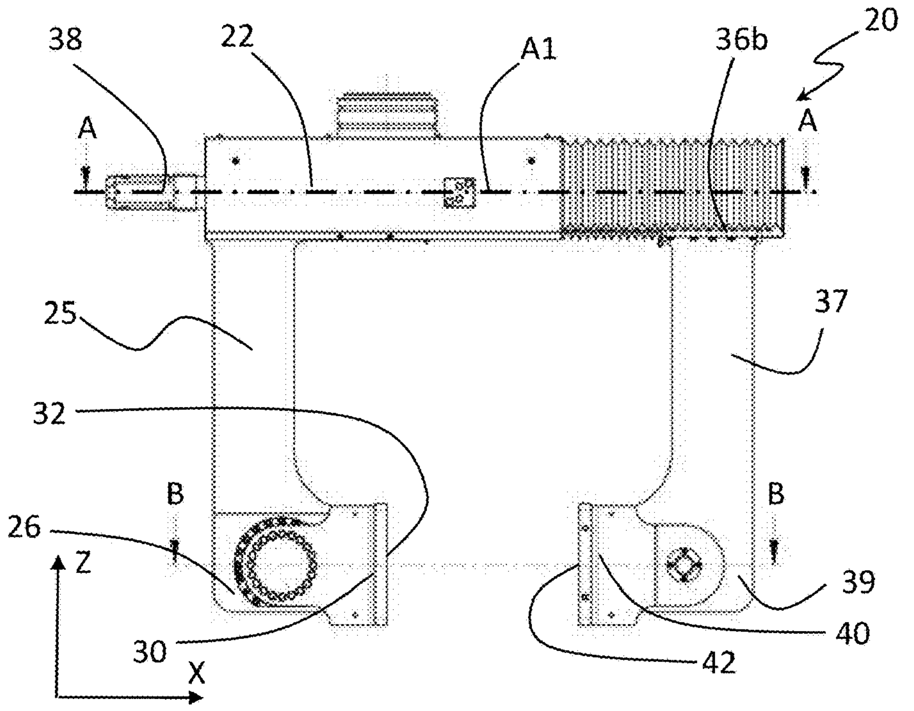
FIG. 6 is a side view of the handling group of the apparatus of FIGS. 1A and 1B.
Figure 6A:
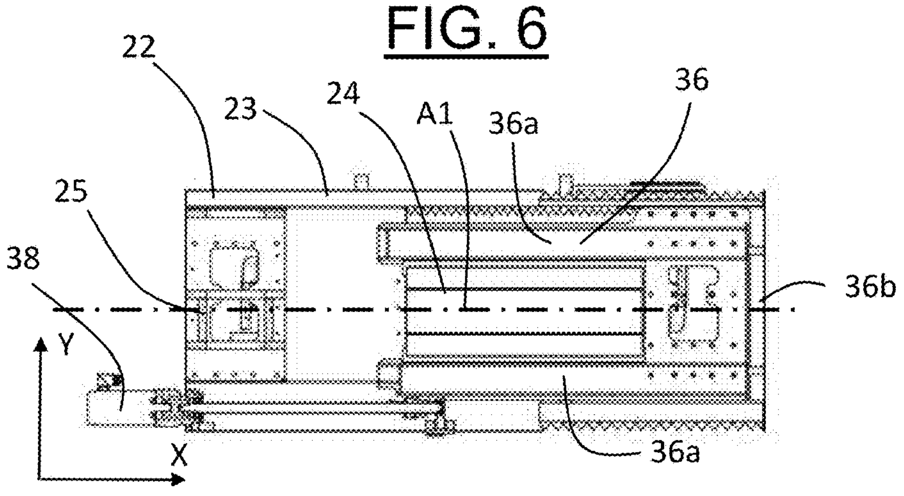
FIG. 6A is a sectional view along the line A-A of FIG. 6.
Figure 6B:
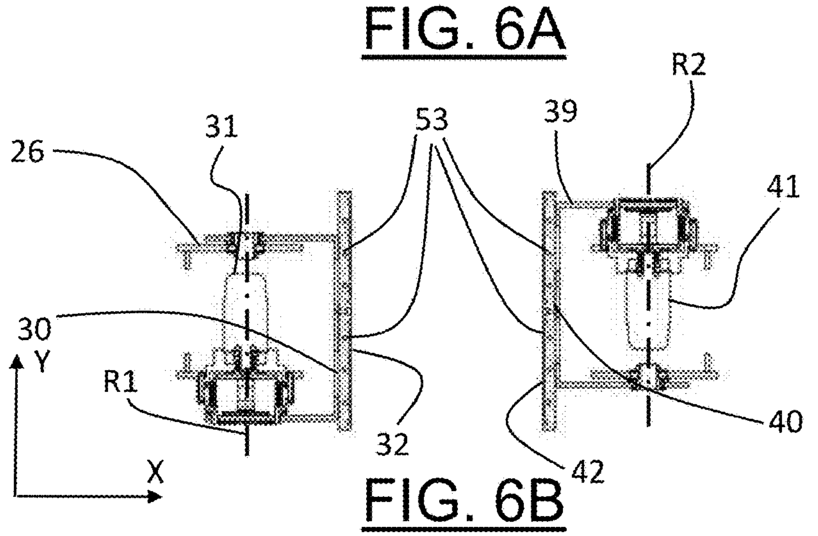
FIG. 6B is a sectional view along the line B-B of FIG. 6.

Preferably, the horizontally extending portion 36 of the second supporting arm 35 comprises a plurality of rod-shaped elements 36*a* parallel to each other, slidably mounted in the housing zone 24, as illustrated in FIG. 6A.

Preferably, the horizontally extending portion 36 of the second supporting arm 35 is slidably mounted substantially in a drawer-like fashion in the housing zone 24 along a horizontal axis A1 between a first insertion position, illustrated in FIGS. 7A-7D and 8A-8E, and a second extraction position, shown in FIGS. 7E-7G, 7J-7L, 8F-8J and 8M-8O.

In the first insertion position, the horizontally extending portion 36 of the second supporting arm 35 is preferably substantially entirely housed in the housing zone 24 and the distance between the vertically extending portion 37 of the second arm 35 and the first arm 25 is minimal.

In the second extraction position, the horizontally extending portion 36 of the second supporting arm 35 is preferably partially extracted from the housing zone 24 and the distance between the vertically extending portion 37 of the second arm 35 and the first arm 25 is maximum.

The stroke of the horizontally extending portion 36 of the second supporting arm 35 between the first insertion position and the second extraction position can vary within wide ranges and can be determined by a person skilled in the art according to application requirements.

In preferred embodiments, the stroke of the horizontally extending portion 36 of the second supporting arm 35 between the first insertion position and the second extraction position may vary, in an illustrative and non-limiting example, between 250 and 900 mm.

In the preferred embodiments illustrated, the apparatus 1 comprises an actuator device 38 mounted on the supporting body 22 and configured to move the horizontally extending portion 36 of the second supporting arm 35 between the first insertion position, illustrated in FIGS. 7A-7D and 8A-8E, and the second extraction position, illustrated in FIGS. 7E-7G, 7J-7L, 8F-8J and 8M-8O, e.g. by means of a pinion-rack or screw-nut mechanism.

In the preferred embodiments illustrated, the vertically extending portion 37 of the second supporting arm 35 is rigidly connected to the horizontally extending portion 36 at an end 36*b* of the latter facing away from the first supporting arm 25 and extends vertically downwards therefrom.

Preferably, the vertically extending portion 37 of the second supporting arm 35 has substantially the same vertical extension as the first supporting arm 25.

The vertical extension of the first supporting arm 25 and of the second supporting arm 35 can vary within wide ranges and can be determined by a person skilled in the art depending on the application requirements.

Thus, in preferred embodiments, the first supporting arm 25 and the second supporting arm 35 may have a vertical extension that may be comprised between 600 and 1500 mm in an indicative and non-limiting example.

In the preferred embodiment illustrated, the apparatus 1 comprises a second gripping device 40 of the pieces hinged at a lower end 39 of the vertically extending portion 37 of the second supporting arm 35 so as to rotate about a second horizontal axis R2 parallel to the first horizontal axis R1.

Preferably, the rotation of the second gripping device 40 with respect to the second supporting arm 35 is operated by an actuator device 41, mounted at the lower end 39, as illustrated in FIG. 5.

Figure 7A:
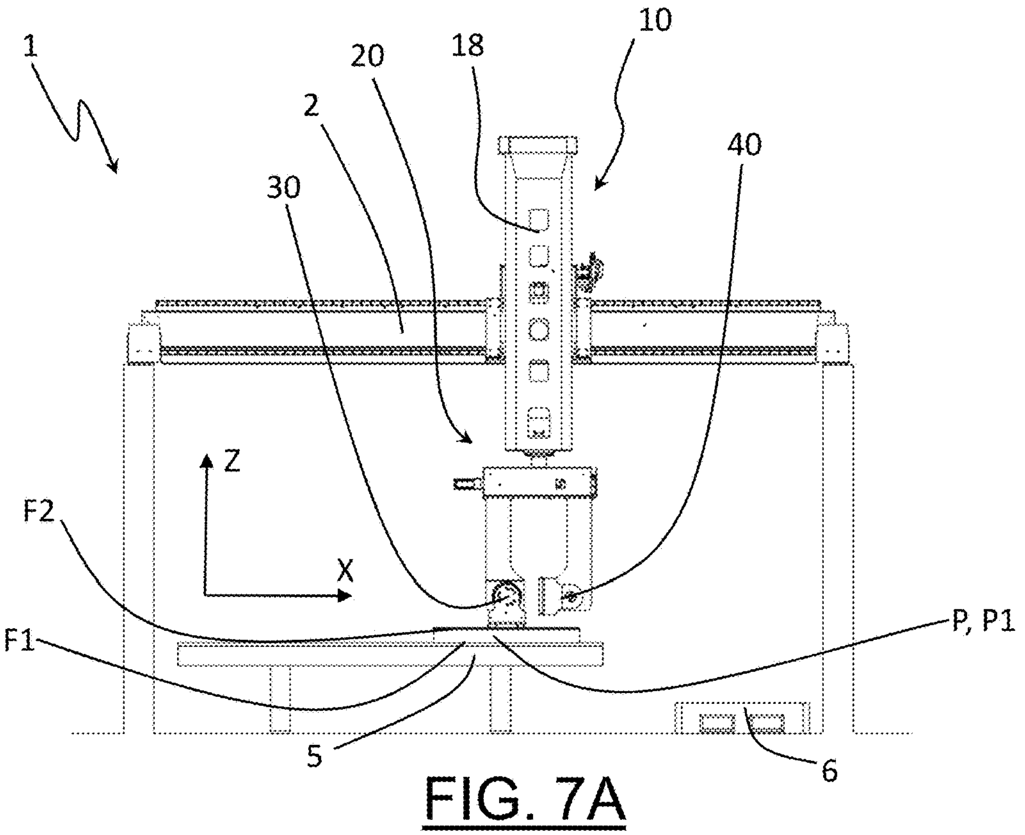
FIGS. 7A to 7L show respective schematic side views of the apparatus of FIG. 1A in different operating configurations.
Figure 7B:
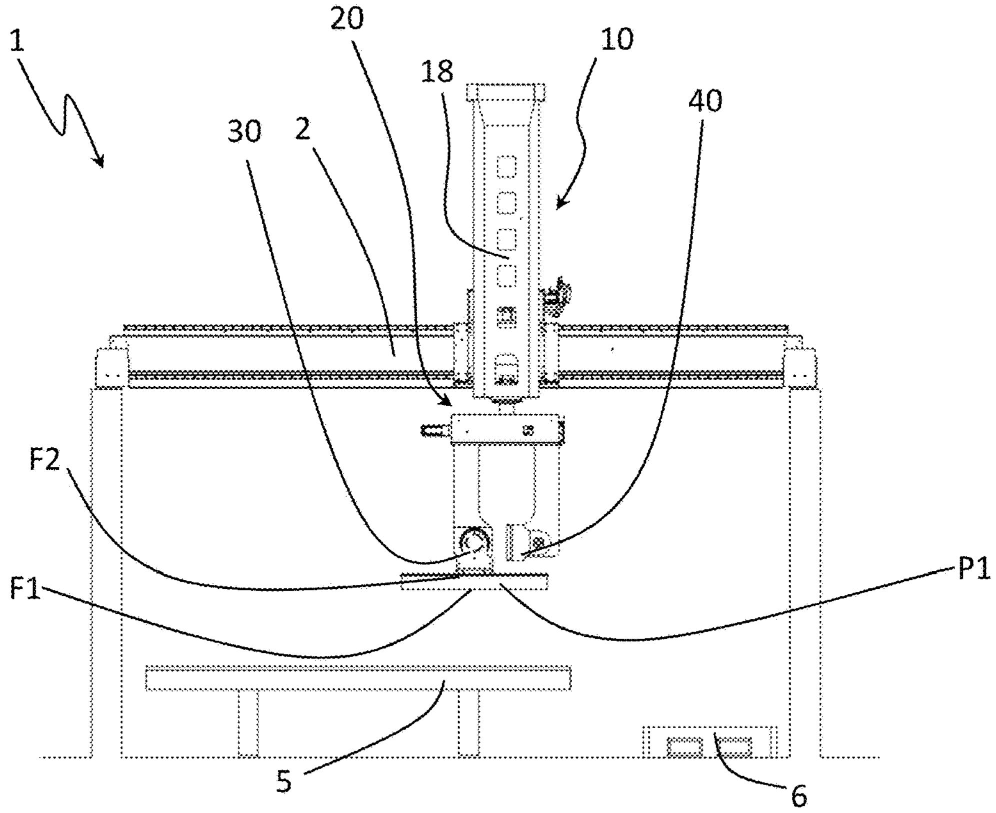
Figure 7C:
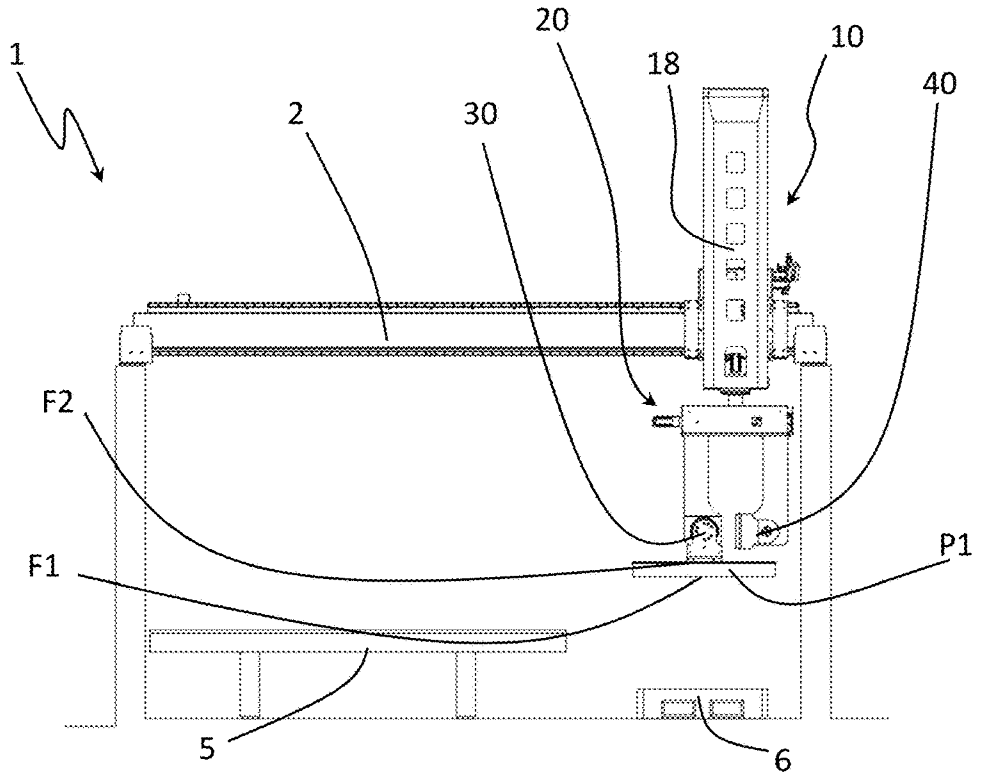
Figure 7D:
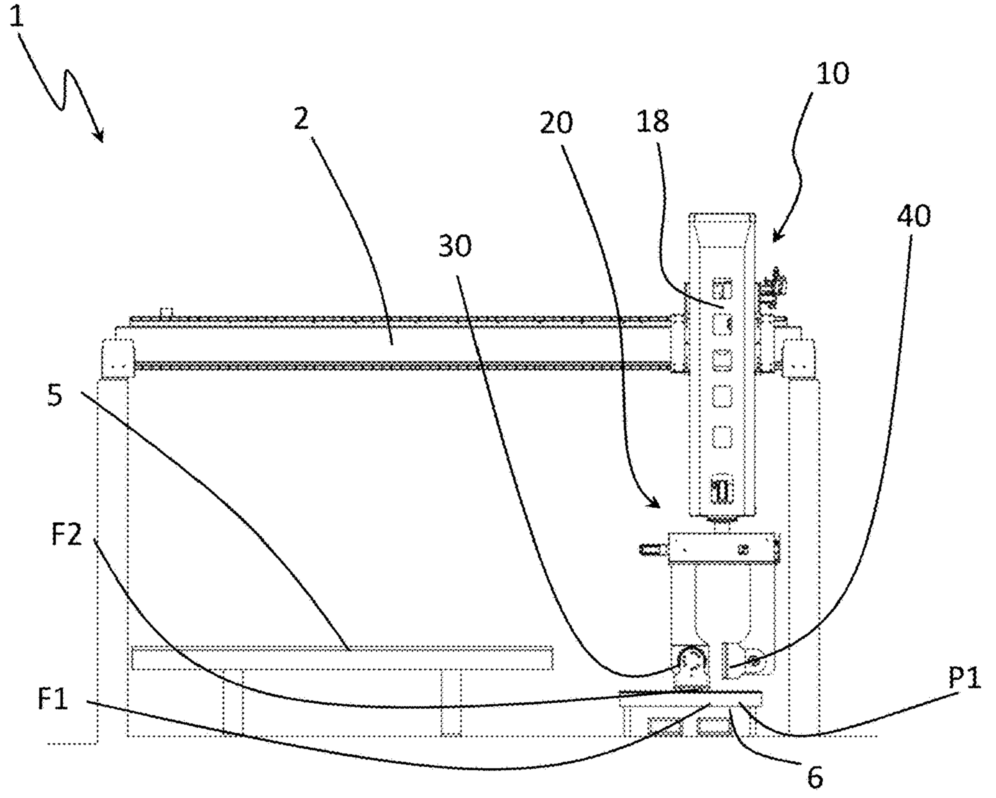
Figure 7E:
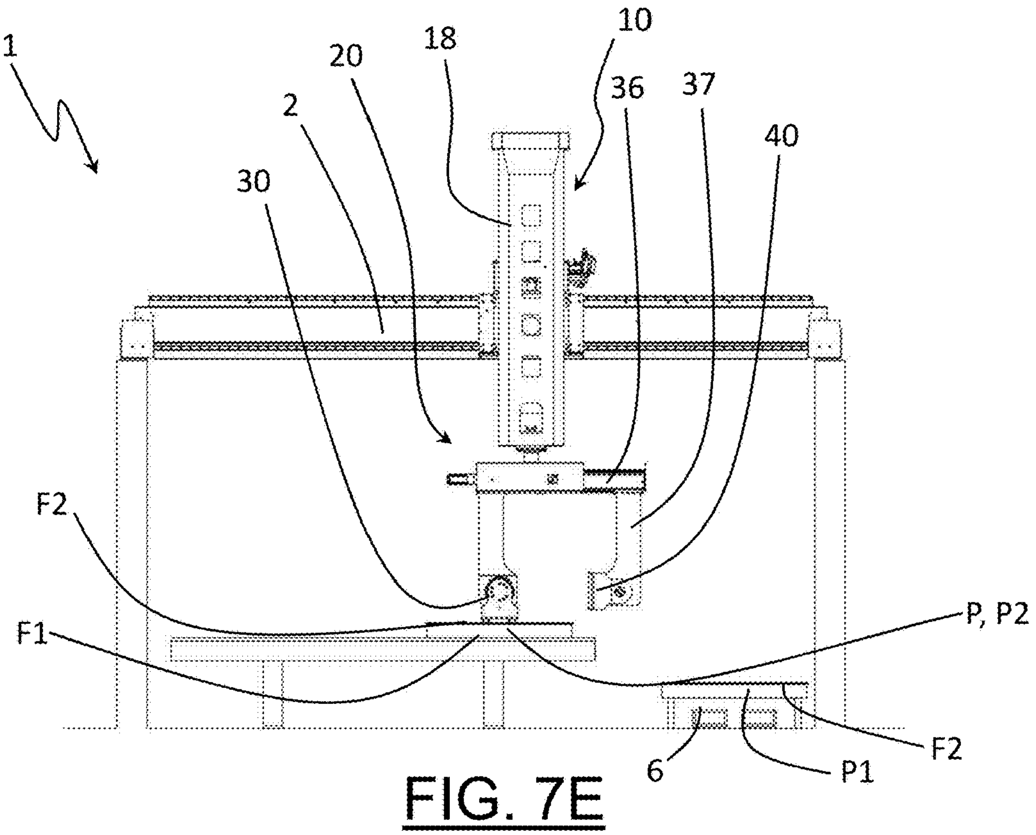
Figure 7F:
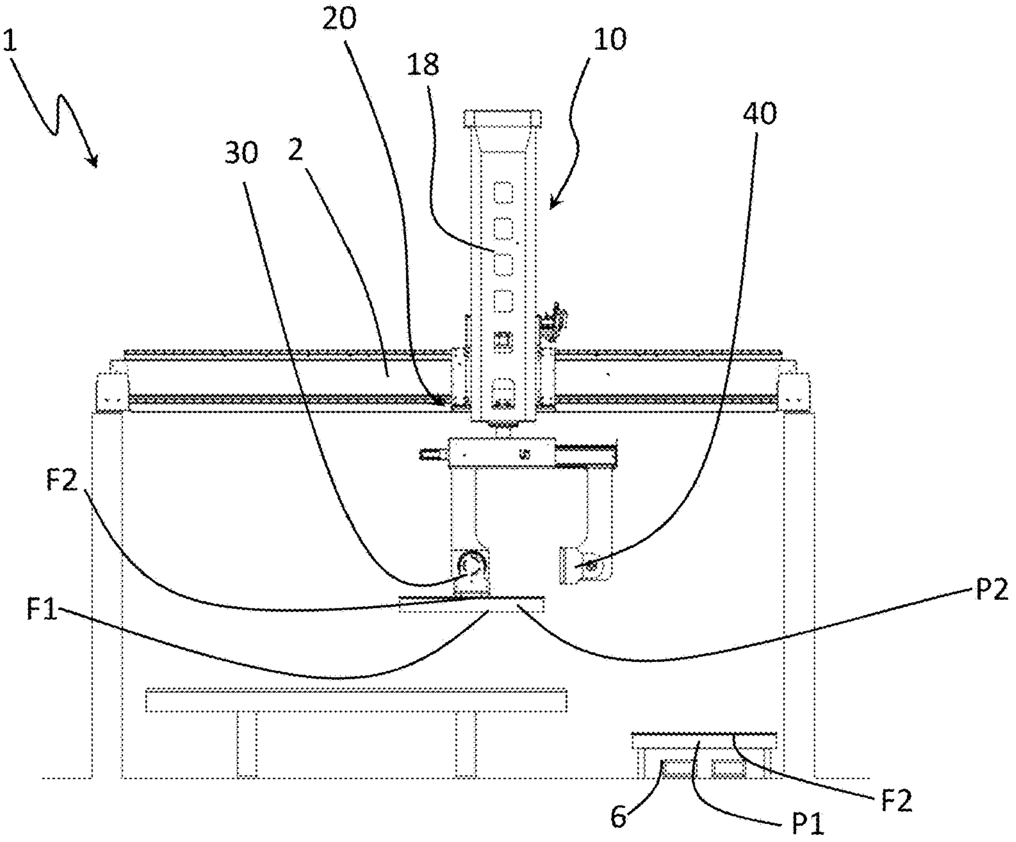
Figure 7G:
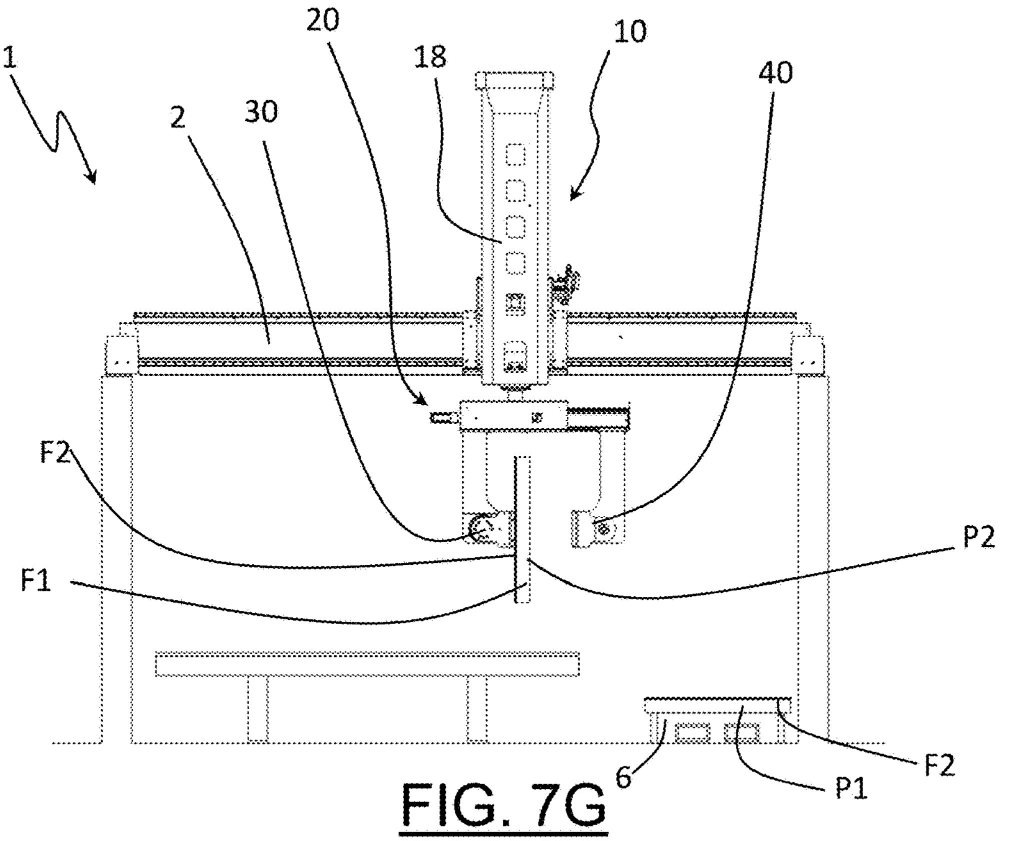
Figure 7H:
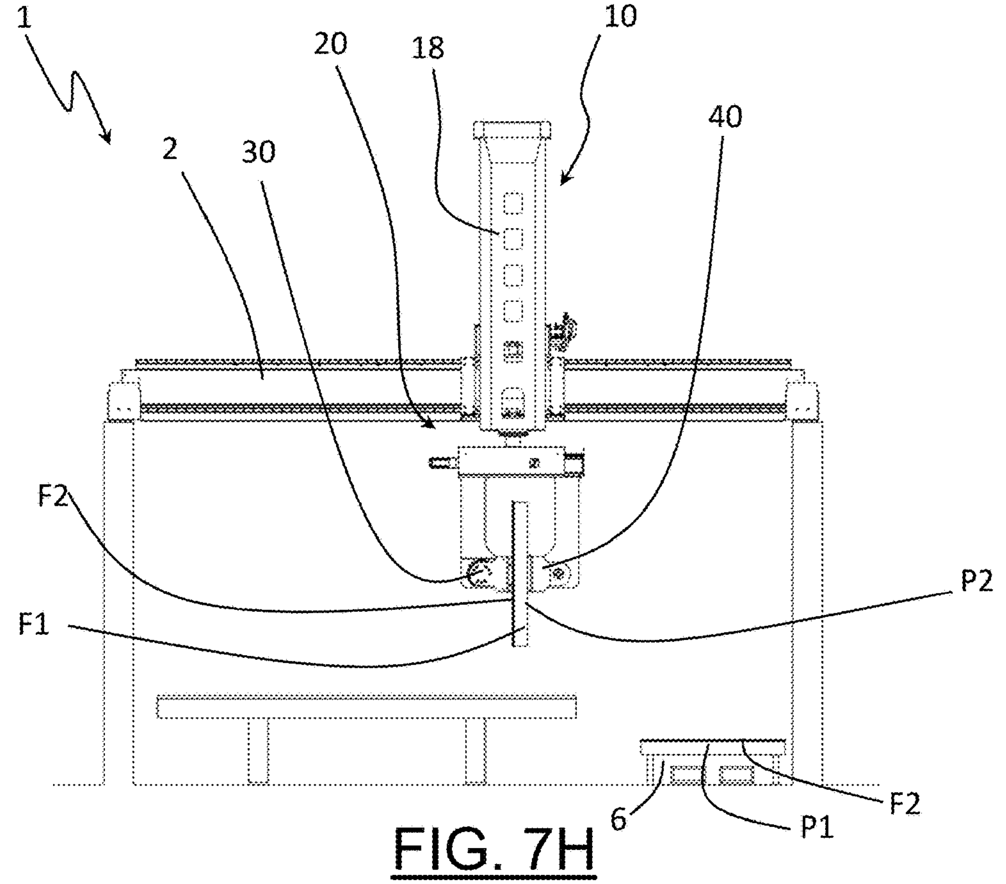
Figure 7I:
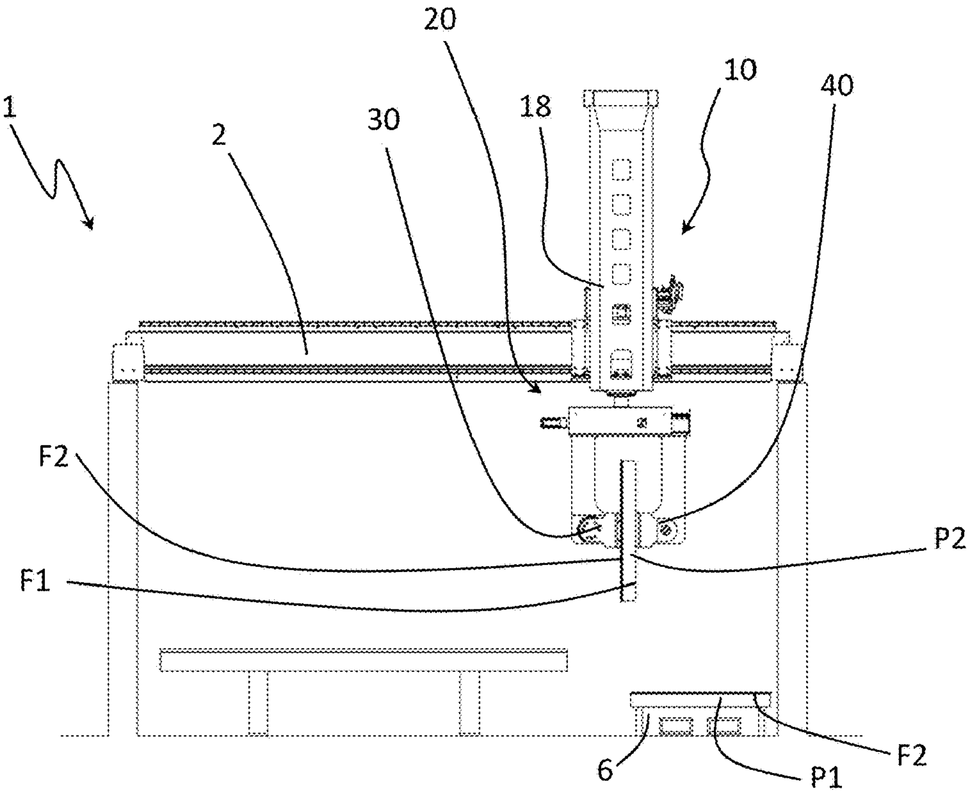
Figure 7J:
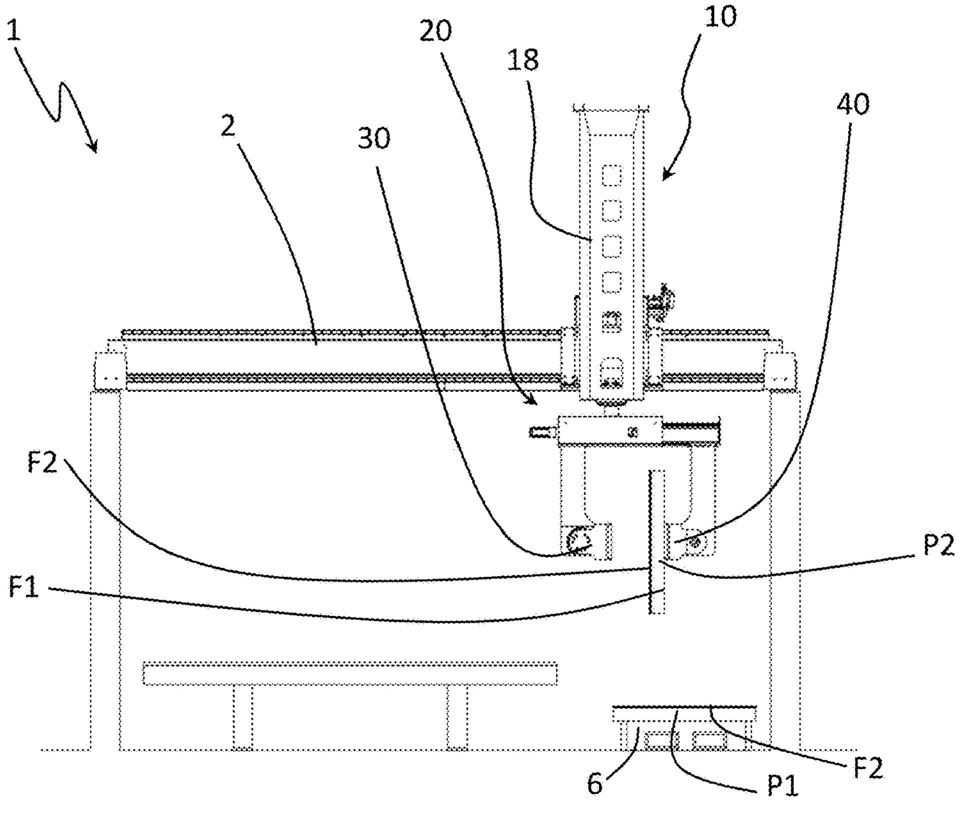
Figure 7K:
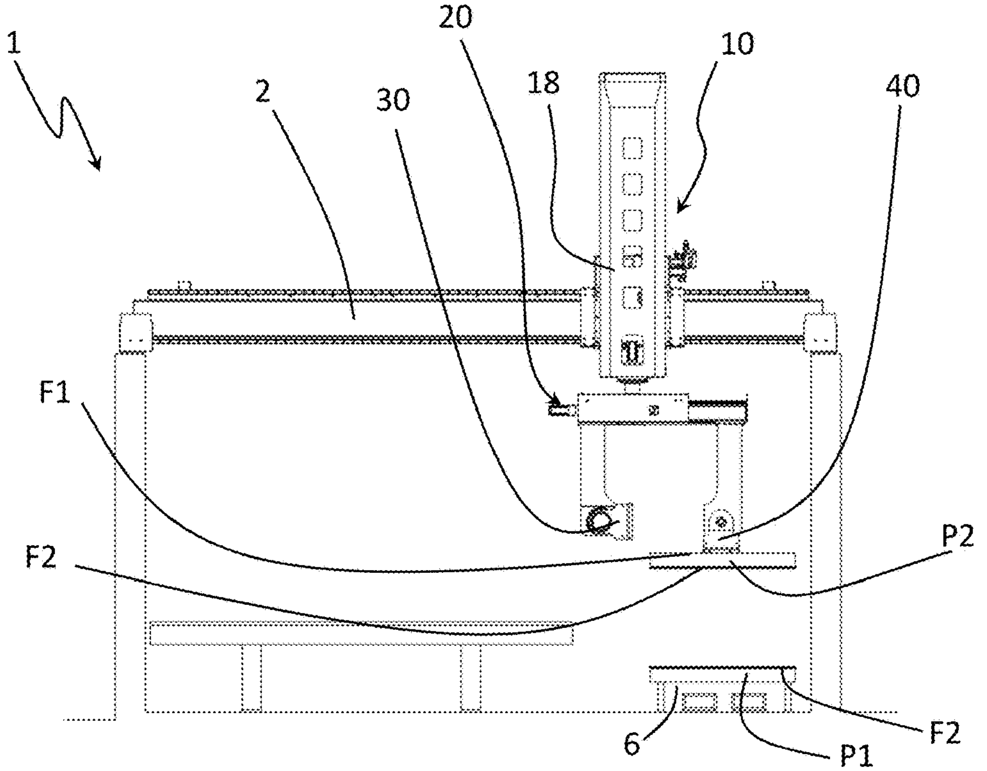
Figure 7L:
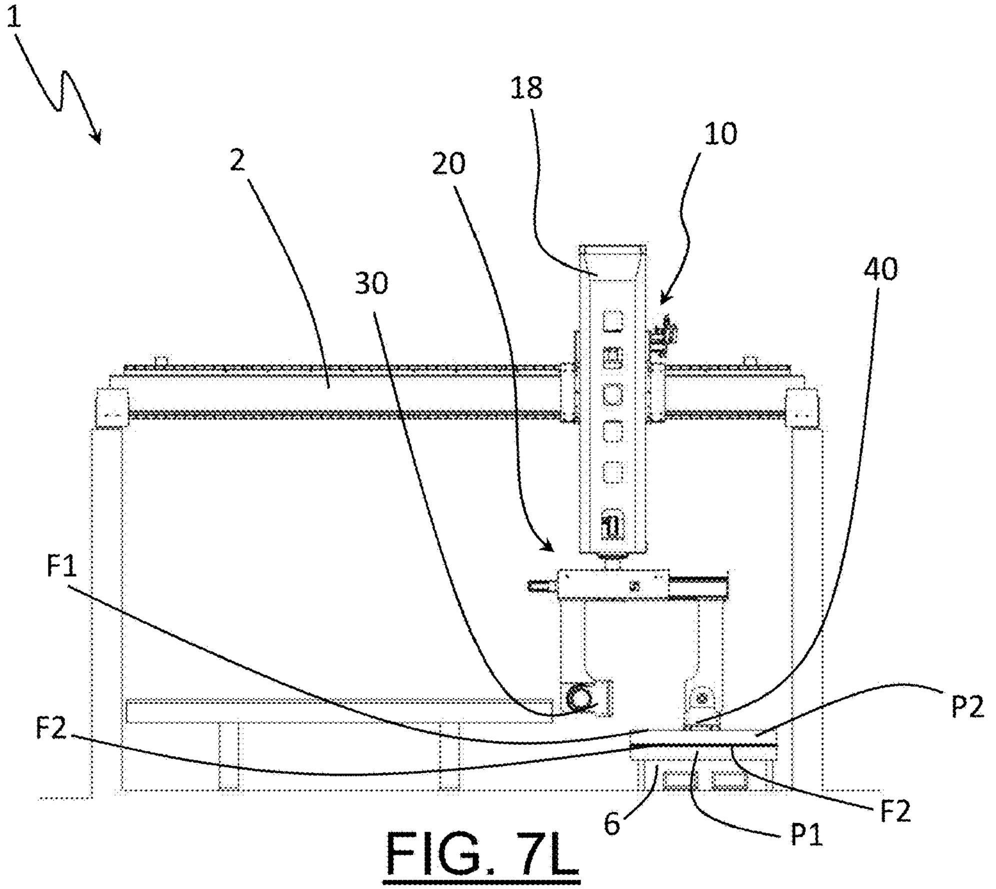
Figure 8A:
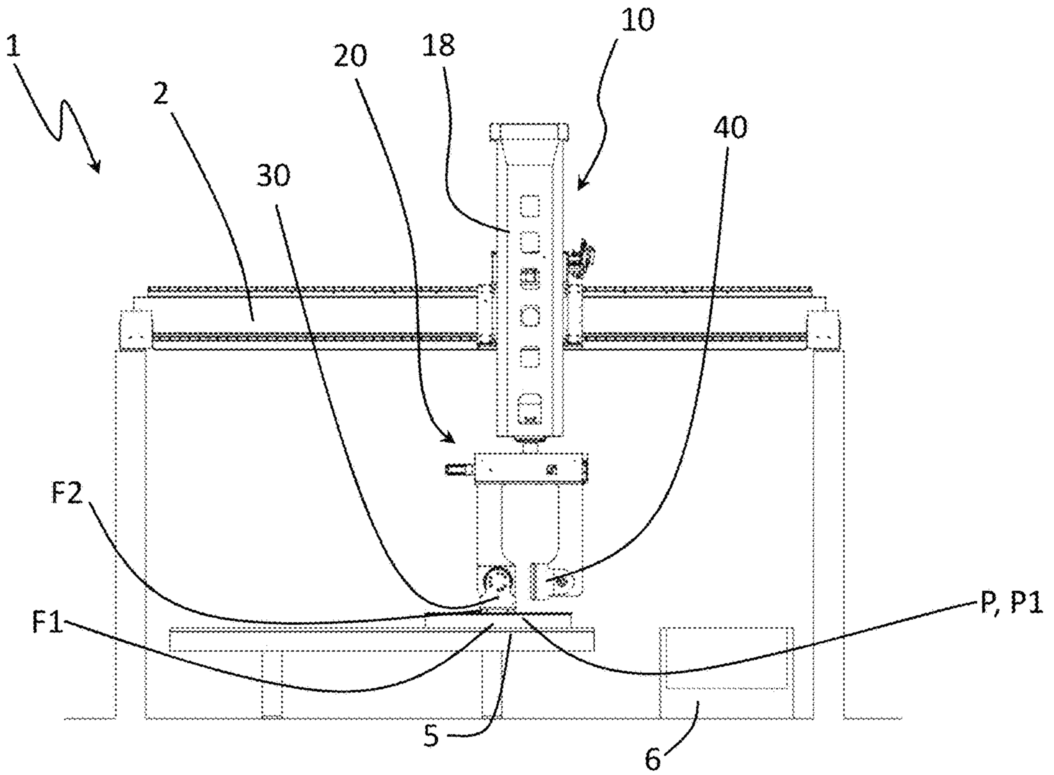
FIGS. 8A to 8O show respective schematic side views of the apparatus of FIG. 1A in different operating configurations.
Figure 8B:
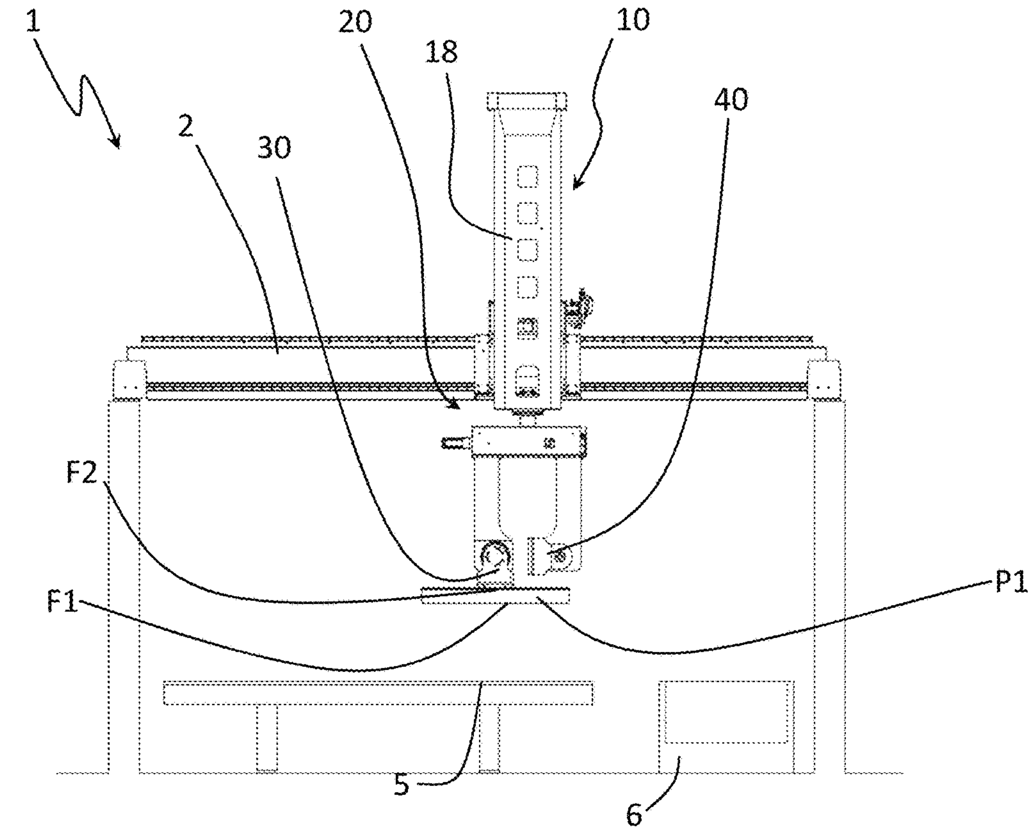
Figure 8C:
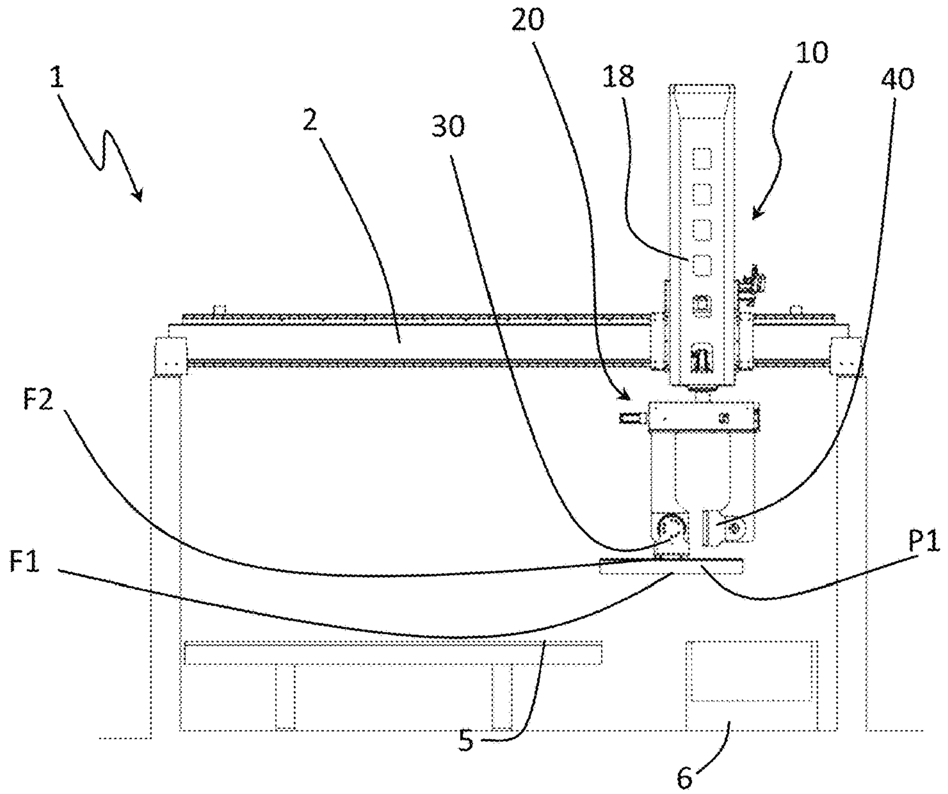
Figure 8D:
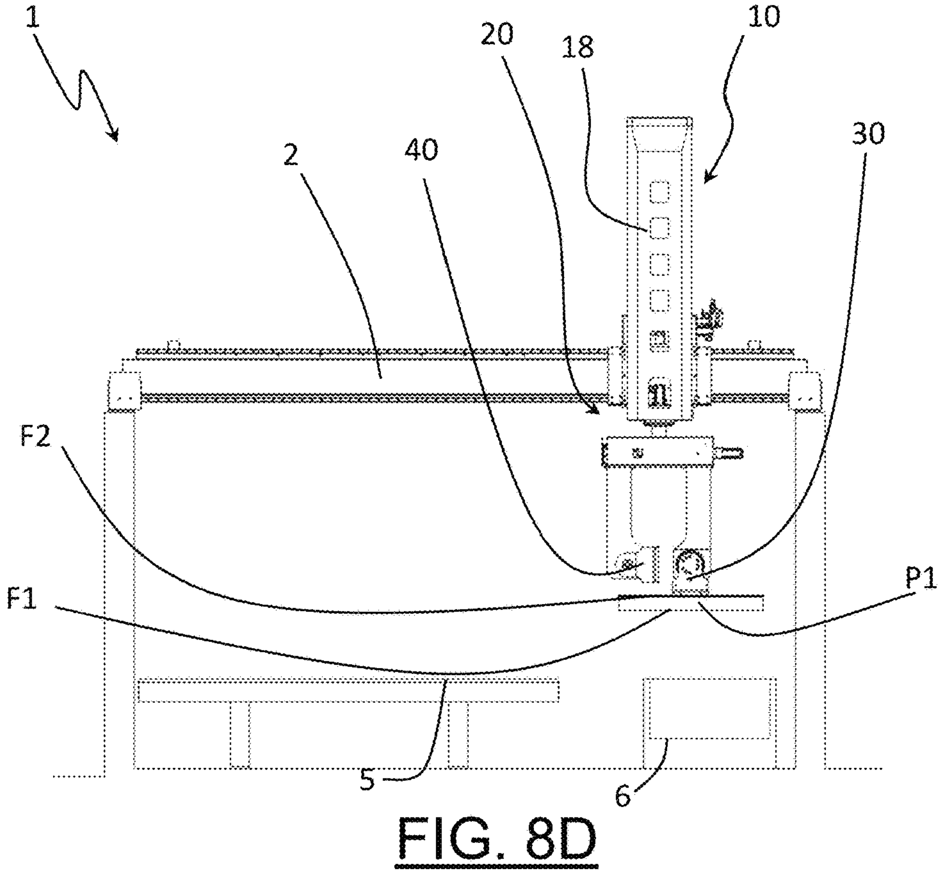
Figure 8E:
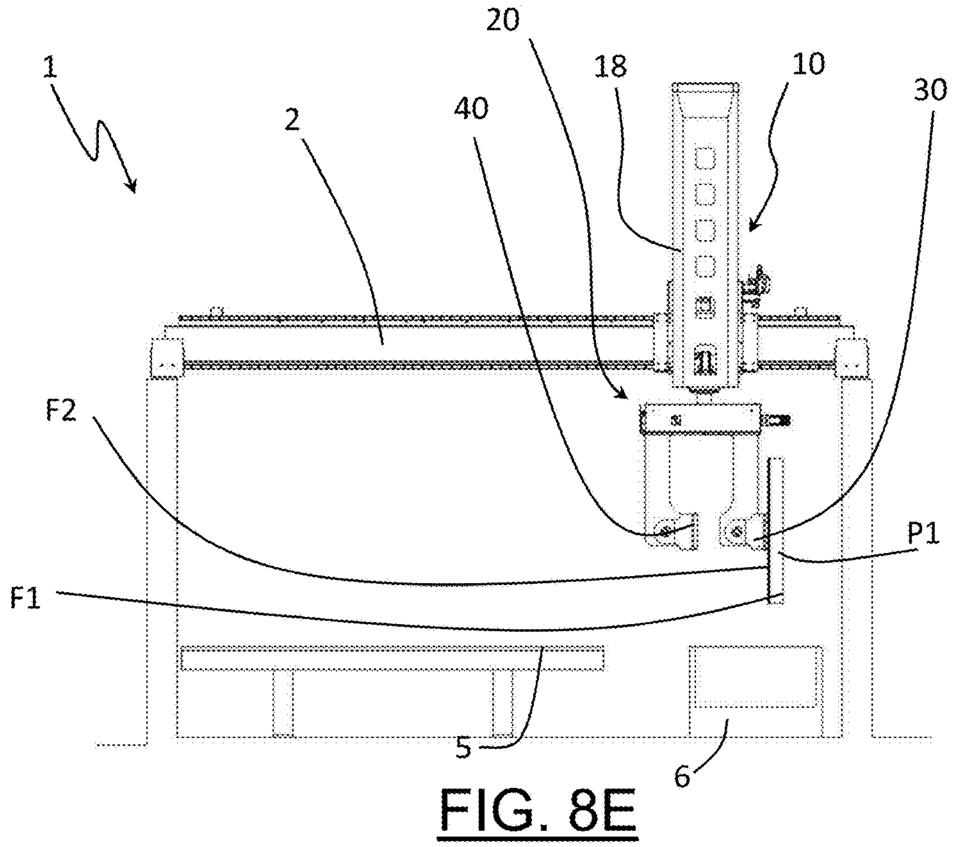
Figure 8F:
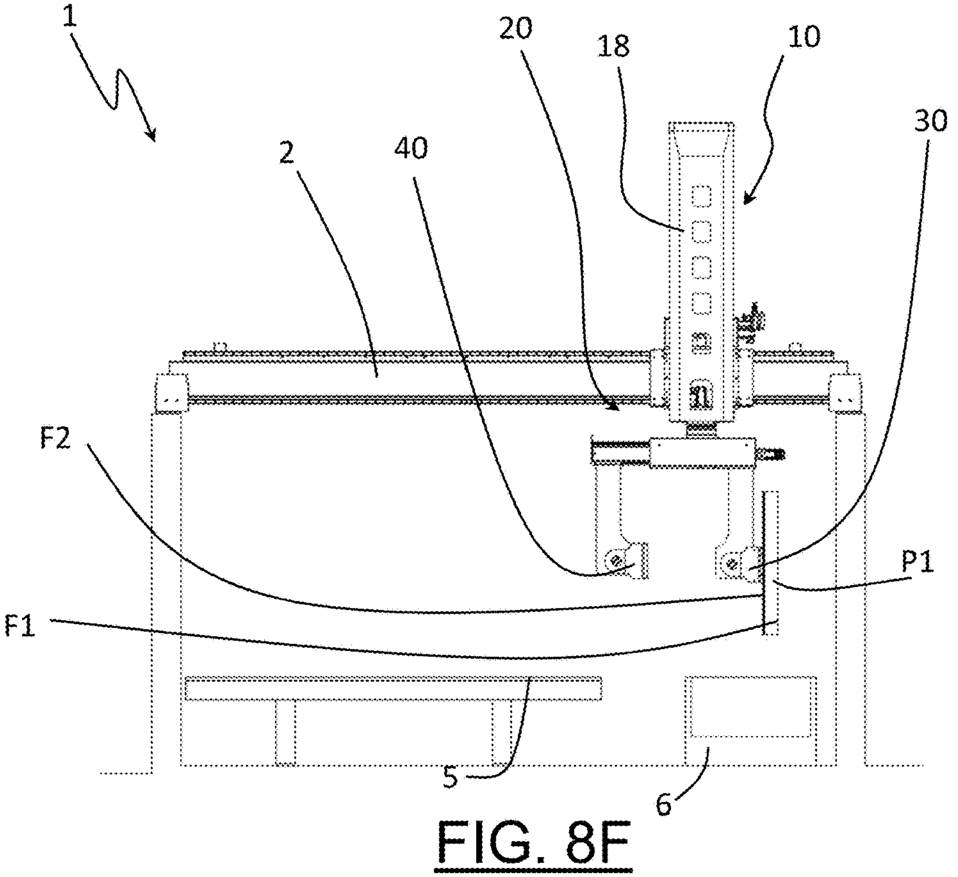
Figure 8G:
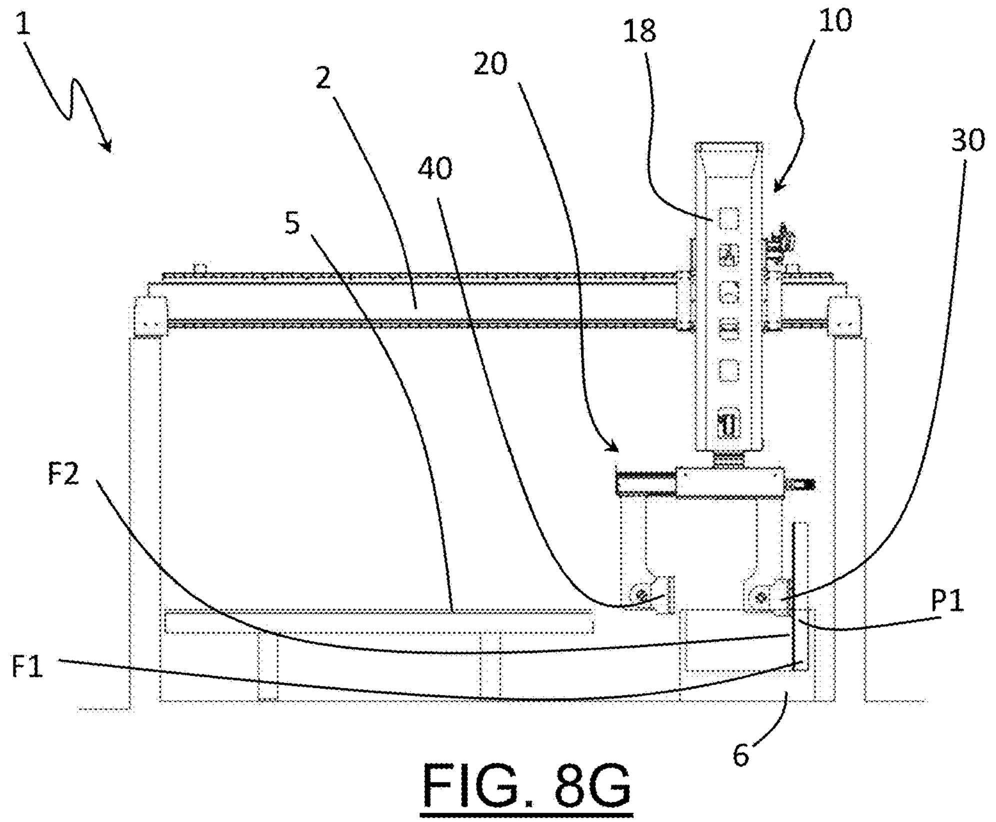
Figure 8H:
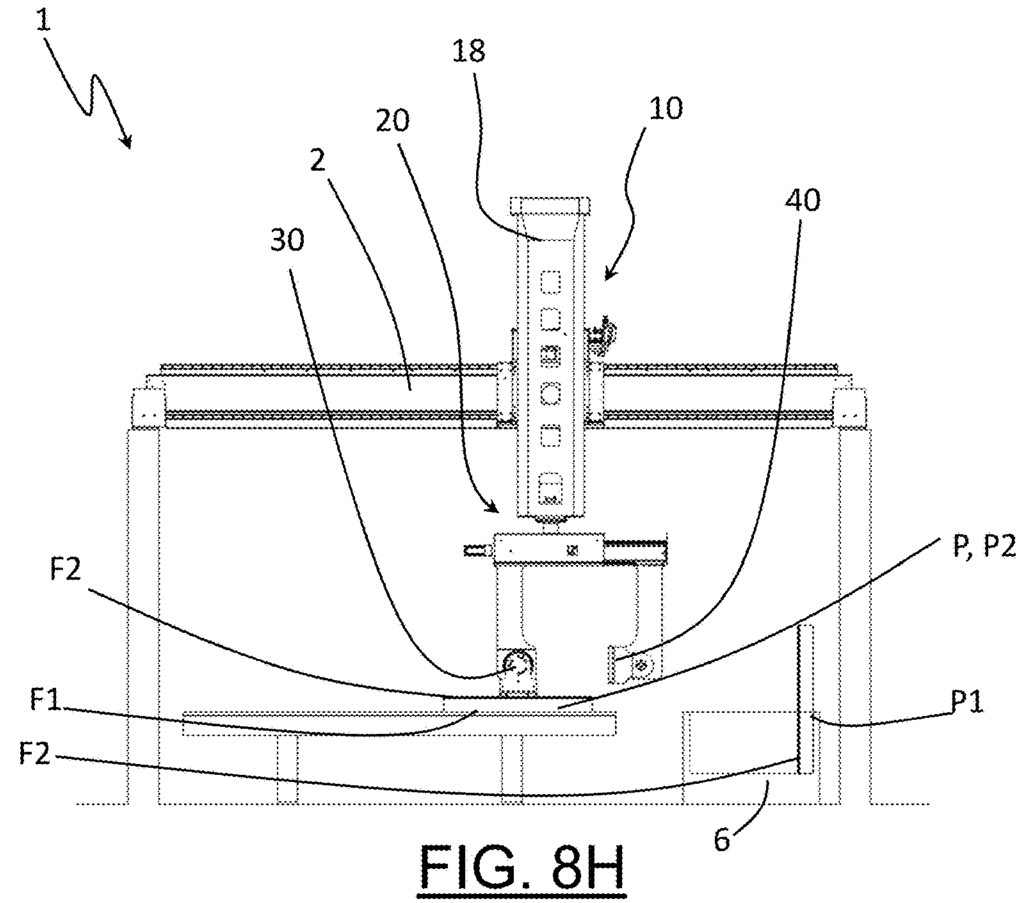
Figure 8I:
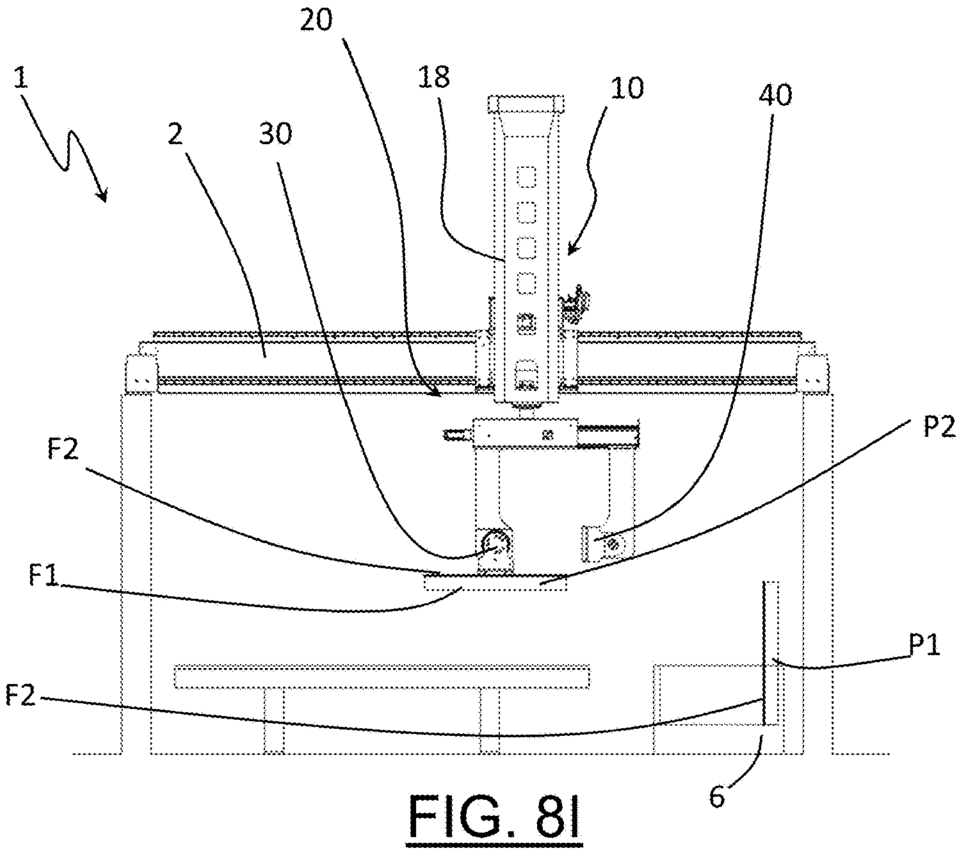
Figure 8J:
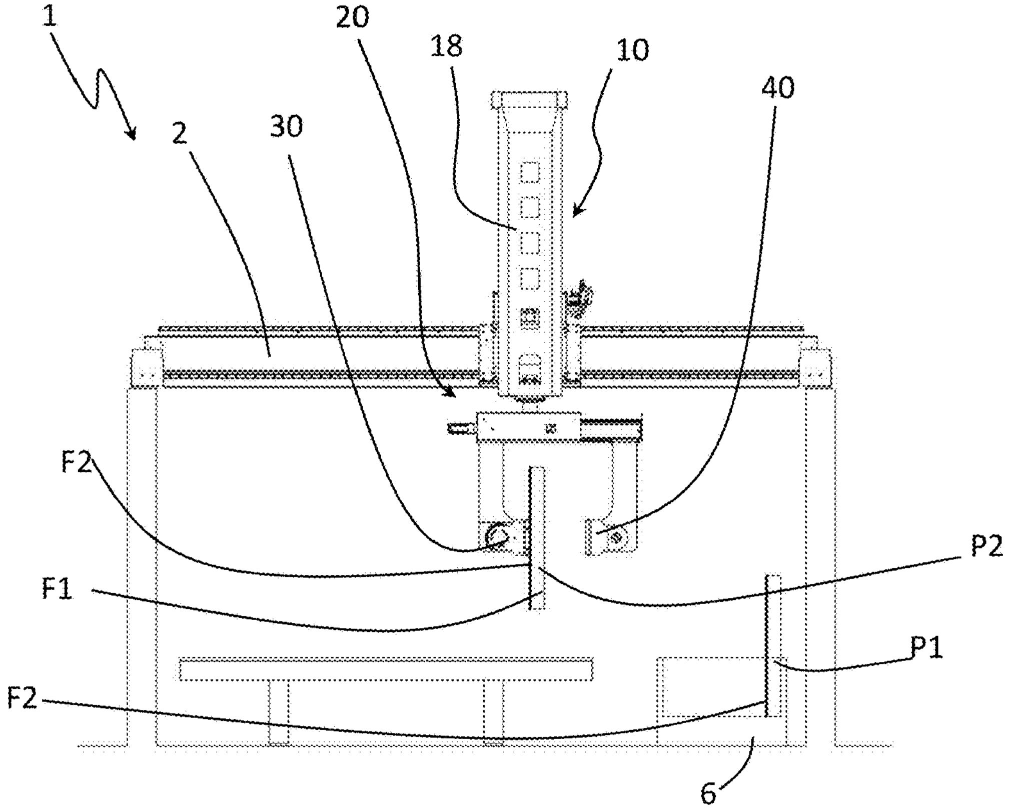
Figure 8K:
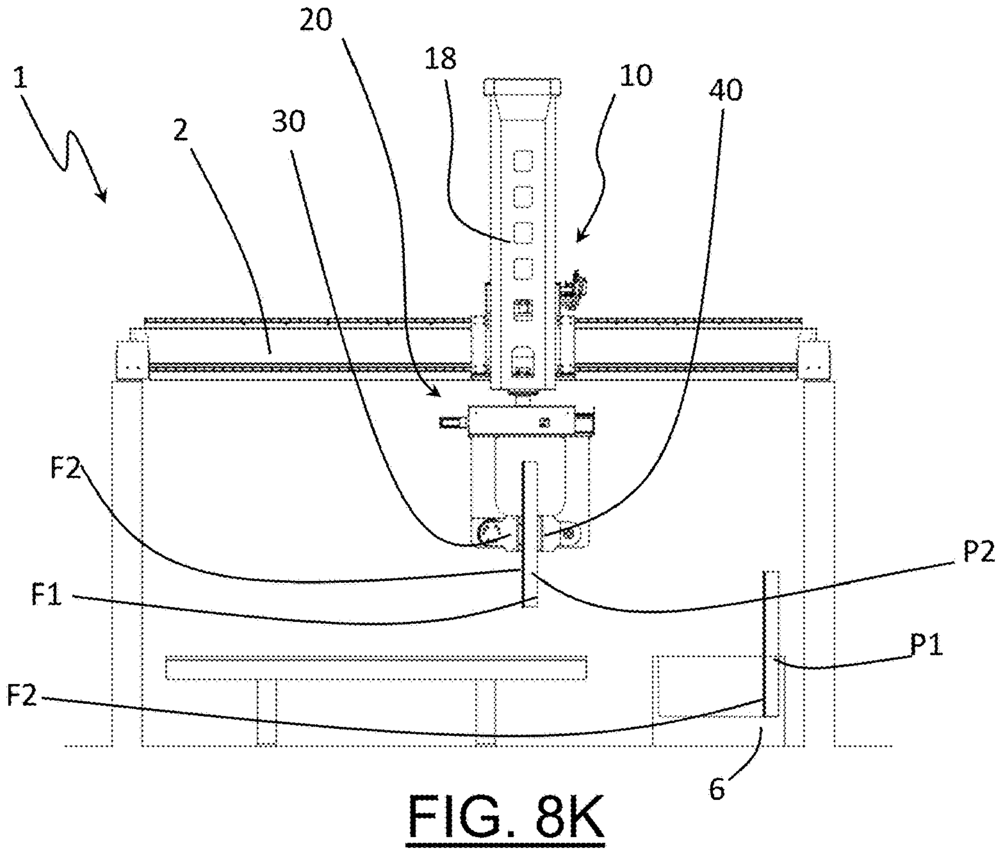
Figure 8L:
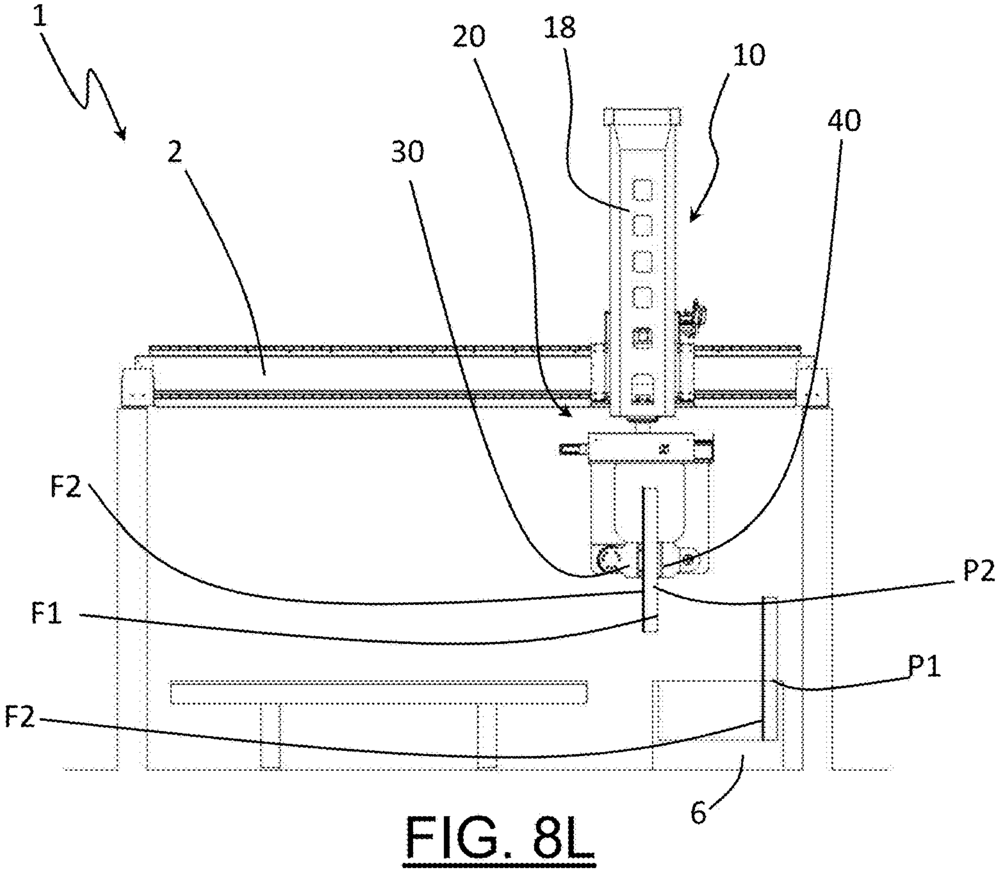
Figure 8M:
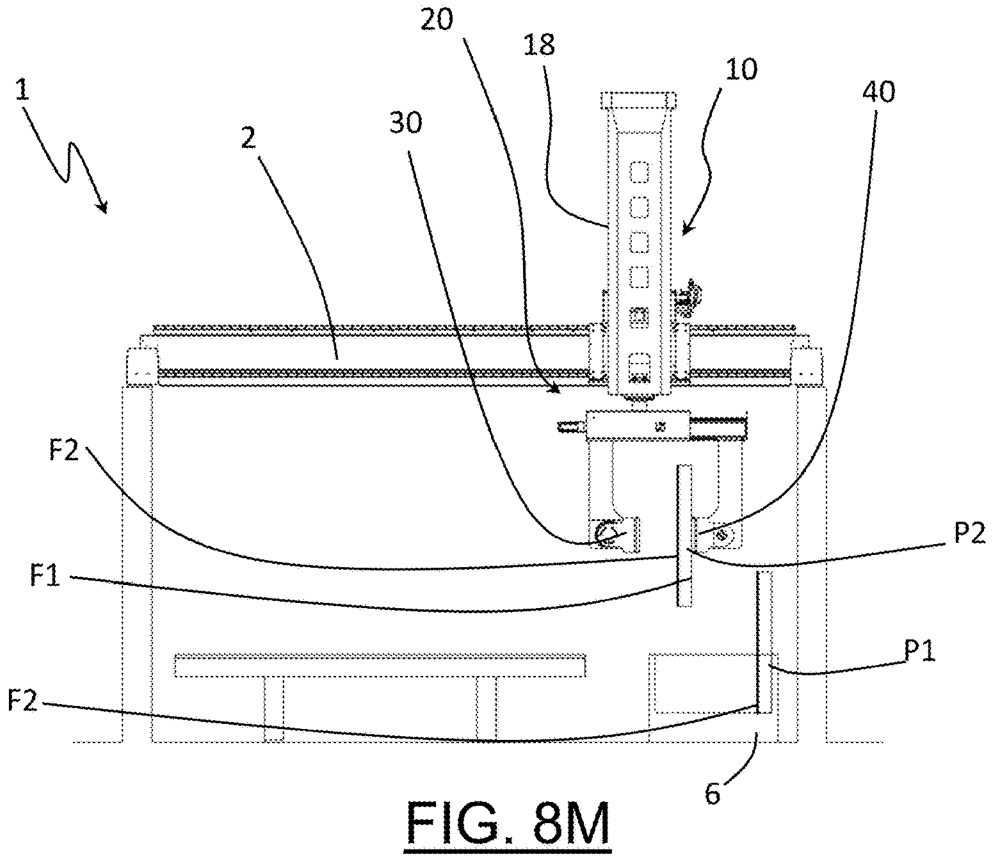
Figure 8N:
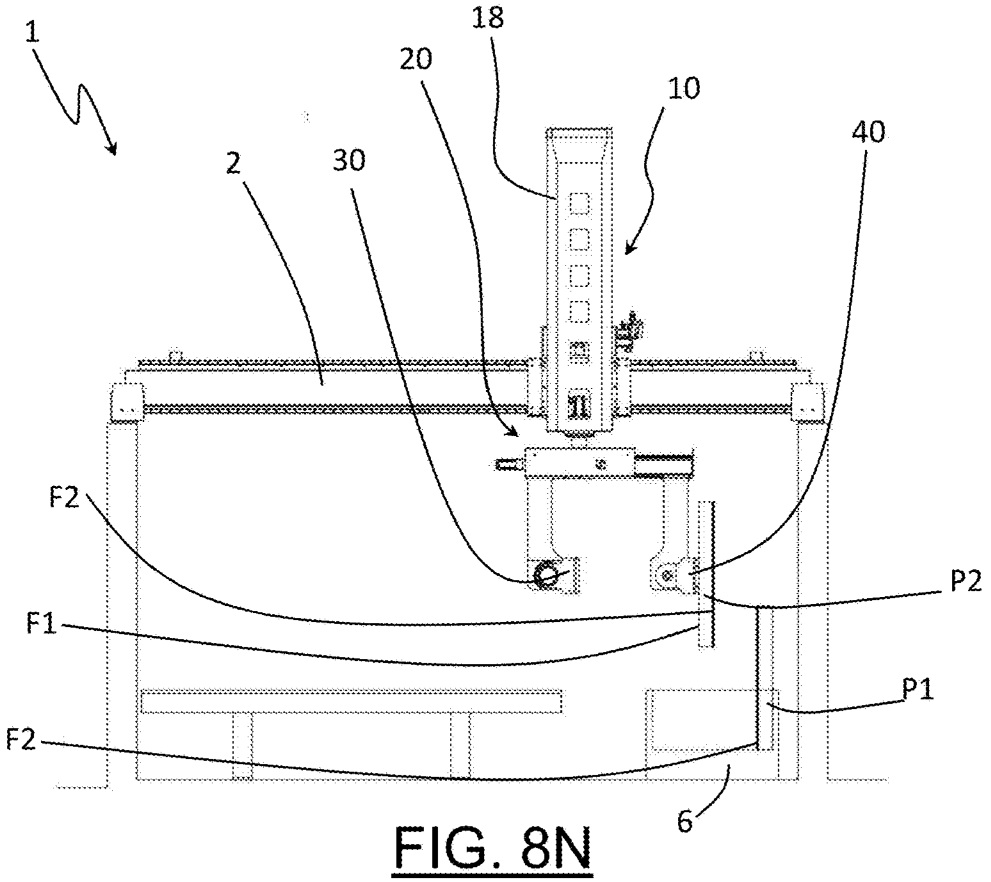
Figure 8O:
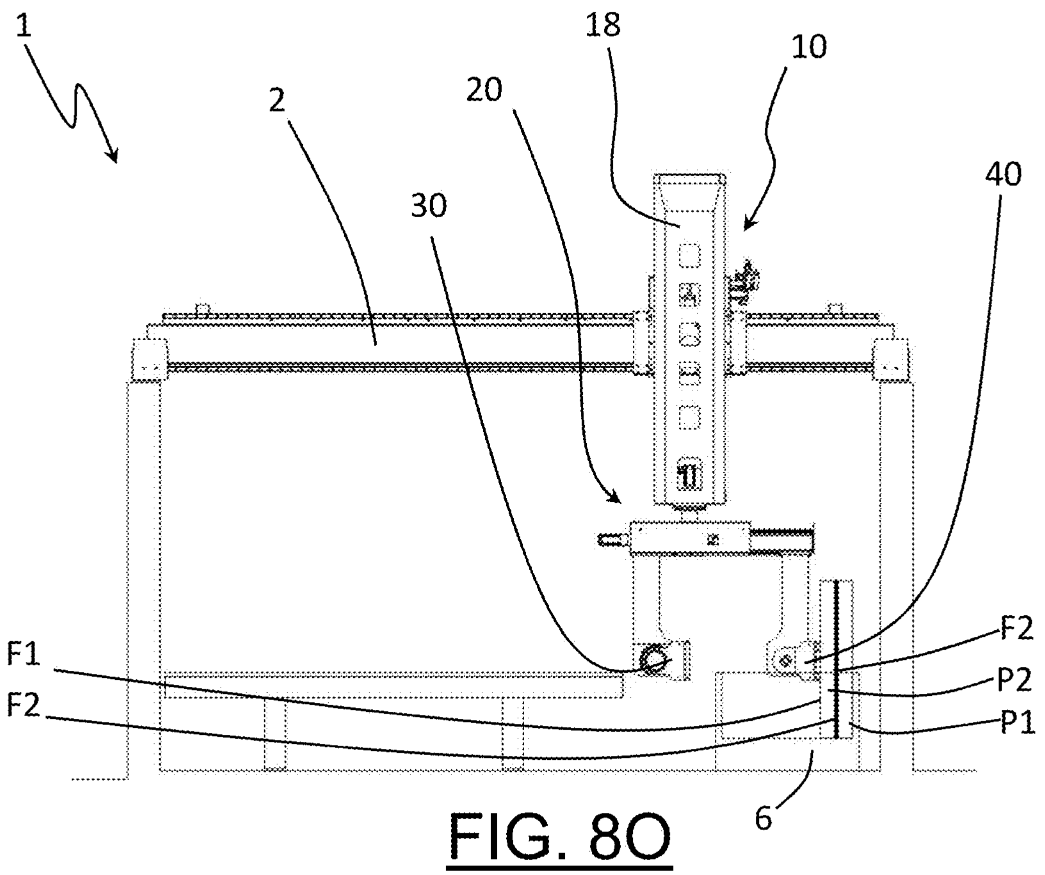

Preferably, the second gripping device 40 is rotatable about the second horizontal axis R2 between:

- a horizontal configuration—shown in FIG. 7K-7L—parallel to the piece-supporting plane 5,
- a first vertical configuration—illustrated in FIGS. 4, 5, 7A-7J and 8A-8M—perpendicular to the piece-supporting plane 5 and oriented at 90° with respect to the horizontal configuration, wherein the second gripping device 40 faces the first gripping device 30, and
- a second vertical configuration—shown in FIG. 8N-8O—perpendicular to the piece-supporting plane 5, oriented at 90° with respect to the horizontal configuration and rotated of 180° with respect to the first vertical configuration, wherein the second gripping device 40 faces away from the first gripping device 30.

Preferably, the second gripping device 40 comprises a gripping face 42 defining a second gripping plane of a worked piece P.

Preferably, the gripping face 42 is configured to be placed in contact with a face of a worked piece P to exert a retaining action of the second gripping device 40 on the piece itself.

In the preferred embodiment illustrated, the first gripping device 30 and the second gripping device 40 each comprise one or more gripping elements 50, for example two gripping elements 50 for each gripping device 30, 40, configured to exert a pneumatic retaining action on a face of a piece P.

Preferably, each gripping element 50 comprises at least one suction element comprising a membrane 51, which encloses a gripping area 52 defined in the respective gripping face 32, 42.

Preferably, the first gripping device 30 and the second gripping device 40 each comprise a plurality of holes 53 open on the gripping area 52 and in fluid communication with a pneumatic system (not shown) configured to exert a pneumatic suction action on the gripping area 52.

The above described apparatus 1 is configured to move the first gripping device 30 and the second gripping device 40 between a plurality of operating positions.

In particular, the actuator device 15 drives the movement of the crossbeam 2, on which the transversal guide 14 extends, with respect to the vertical support structures 12 and the longitudinal guides 13 associated thereto and is therefore configured to translate the gripping devices 30, 40 along the Y axis.

The actuator device 17 drives the movement of the slide 16 along the transversal guide 14 and is therefore configured to move the gripping devices 30, 40 on the crossbeam 2 along the X axis.

The actuator device 19 drives the vertical movement of the support member 18 with respect to the slide 16 and is therefore configured to translate the gripping devices 30, 40 perpendicularly to the crossbeam 2 and the piece-supporting plane 5 along the vertical axis Z1.

The actuator device 21 drives the rotational movement of the handling group 20 about the vertical axis Z1 and is therefore configured to rotate the gripping devices 30, 40 about the vertical axis Z1.

The actuator device 31 drives the rotational movement of the first gripping device 30 with respect to the first supporting arm 25 and is therefore configured to rotate the first gripping device 30 about the first horizontal axis R1.

The actuator device 38 drives the translation movement of the horizontally extending portion 36 of the second supporting arm 35 and is therefore configured to translate the second gripping device 40 along the horizontal axis A1 away from and towards the supporting body 22 of the handling group 20 and, at the same time, away from and towards the first gripping device 30.

The actuator device 41 drives the rotational movement of the second gripping device 40 with respect to the second supporting arm 35 and is therefore configured to rotate the second gripping device 40 about the second horizontal axis R2.

In the preferred embodiment illustrated, the first gripping device 30 and the second gripping device 40 of the apparatus 1 are thus movable between a pick-up position (illustrated in FIGS. 7A, 7E, 8A and 8H), an exchange position (illustrated in FIGS. 7H and 8K) and a laying position (illustrated in FIGS. 7D, 7L, 8G and 8O).

In the pick-up position, the first gripping device 30 or the second gripping device 40 is arranged in a horizontal configuration with the respective first or second gripping face 32 or 42 adjacent to a finished face F2 or to a rough face F1 of a worked piece P lying on the piece-supporting plane 5.

For the sake of clarity, in FIGS. 7A-7L and 8A-8O the finished face F2 of worked piece P is illustrated with a thicker line.

In the exchange position, the handling group 20 is arranged at a higher position than the pick-up position so that the worked piece P can be rotated about a horizontal axis R1; R2 without coming in contact with the piece-supporting plane 5.

Both the first gripping device 30 and the second gripping device 40 are arranged in the respective first vertical configuration described above so as to be arranged with their respective gripping faces 32, 42, and their respective gripping planes, facing each other.

The horizontally extending portion 36 of the second supporting arm 35 is almost completely inserted into the housing area 24 defined in the supporting body 22 of the handling group 20 so as to keep the first and second gripping devices 30, 40 in close proximity to each other, spaced out by the thickness of a single piece P (see FIGS. 7H, 7I and 8K, 8L).

In the laying position, the operative configuration of the first gripping device 30 or of the second gripping device 40, depending on which of the two gripping devices is moving the worked piece P, provides that the piece P is released from the respective first or second gripping face 32 or 42 at a predetermined position in the piece storage area 6.

In particular, the first gripping device 30 or the second gripping device 40 may be in the respective horizontal configuration for horizontally laying the piece in the piece storage area 6 such as for example illustrated in FIGS. 7D and 7L, or in the respective second vertical configuration, to vertically lay the piece in the piece storage area 6 such as for example shown in FIGS. 8G and 8O.

Preferably, the apparatus 1 further comprises a control unit, not shown, suitably programmed to control the movement of the first gripping device 30 and of the second gripping device 40 as well as their respective support elements according to a control program.

In particular, the control unit preferably comprises a data processing unit, which may comprise one or more electronic processors, configured to execute the control programs of the apparatus 1, in particular to control the movement of the crossbeam 2 along the Y direction, of the supporting equipment 10 along the horizontal X and vertical Z direction, of the second gripping device 40 to and from the supporting body 22, as well as to rotate the first gripping device 30 and the second gripping device 40 about the axes R1 and R2.

In a preferred embodiment, the control unit may also include a user interface, e.g. equipped with a keyboard and a screen, through which interface appropriate input data can be entered for the movements to be performed.

Variants of the apparatus 1 described are possible.

For example, the first gripping device 30 and the second gripping device 40 may each be supported by respective supporting equipments 10 that are structurally independent from each other and movable independently from each other on the crossbeam 2 of the gantry structure 11 or each on a respective crossbeam according to a configuration with two parallel and structurally independent crossbeams.

In this possible preferred embodiment, each supporting equipment 10 moves a respective handling group 20 which a respective gripping device 30, 40 is associated to, movable by the apparatus 1 in a similar manner to that described above with reference to the single handling group 20 of the preferred embodiment illustrated in the figures.

In this possible preferred embodiment provided with structurally independent supporting equipments 10, the movement of the gripping devices 30, 40 relative to each other along the X direction takes place by moving each supporting equipment 10.

According to another variant, the gripping devices 30, 40 can be movably associated to the supporting body 22 of the single handling group 20 by means of respective vertically extending supporting arms that can be moved independently of each other on the supporting body 22 along the X direction.

According to another variant, the first supporting arm 25 may be realized in a similar manner to the second supporting arm 35 described above and may comprise a horizontally extending portion at least partially housed in the housing zone 24 so as to allow a horizontal translation of the first gripping device 30 with respect to the supporting body 22 of the handling group 20 in a similar manner to the second gripping device 40 of the preferred embodiment illustrated in the figures.

Furthermore, according to another variant, the first supporting arm 25 and/or the second supporting arm 35 may be configured so as to allow a rotation of the first gripping device 30 and/or of the second gripping device 40 about respective vertical axes of, or a vertical portion of, the first supporting arm 25 and, respectively, of the second supporting arm 35.

In yet another variant, the first supporting arm 25 and/or the second supporting arm 35 may be configured so as to allow a translation of the first gripping device 30 and/or of the second gripping device 40 along respective vertical axes.

In this case, the apparatus 1 comprises a suitable device for moving the first supporting arm 25 and/or the second supporting arm 35 along respective vertical axes.

In addition, the horizontally extending portion of the first supporting arm 25 and/or of the second supporting arm 35 may be telescopically configured to allow the distance of the first gripping device 30 and, respectively, of the second gripping device 40 from the supporting body 22, to be adjusted independently of each other.

The above-described apparatus 1 may be used to move pairs of worked pieces P having a rough face F1 and an opposite finished face F2 by a preferred embodiment of the method according to the invention which will be described below, by way of illustration only, and not by way of limitation, with reference to the operating configurations of the apparatus 1 of FIG. 1A illustrated in FIGS. 7A-8O.

More particularly, FIGS. 7A to 7L illustrate the operating steps of a method for stacking a pair of worked pieces P1, P2 horizontally, while FIGS. 8A to 8O illustrate the operating steps of a method for stacking the pair of worked pieces P1, P2 vertically.

In a first step, a plurality of pieces P are provided with the rough face F1 resting on the piece-supporting plane 5 and the finished face F2 facing away therefrom.

Next, the apparatus 1 is placed in the pick-up position by placing the first gripping face 32 of the first horizontally oriented gripping device 30 in contact with the finished face F2 of a first worked piece P1 of the plurality of pieces P, and the first worked piece P1 is grasped by activating the suction gripping element 50 of the first gripping device 30, so as to keep the finished face F2 facing the first gripping device 30 itself (FIG. 7A; 8A).

Next, the first gripping device 30 is moved vertically upwards to lift the first worked piece P1 off the piece-supporting plane 5 (FIG. 7B; 8B).

In the preferred embodiment illustrated, the lifting is carried out by operating the actuator device 19, which leads to a translation along the vertical axis Z1 of the supporting equipment 10 with respect to the slide 16 (and thus of the first gripping device 30).

Next, the first gripping device 30 is horizontally translated between a position where the first worked piece P1 is arranged above the piece-supporting plane 5 to a position where the first worked piece P1 is arranged at the piece storage area 6 (FIG. 7C; 8C).

This translation can have a longitudinal component (parallel to the Y axis) and/or a transverse component (parallel to the X axis).

Preferably, the longitudinal component of the translation of the first gripping device 30 may be achieved by a translation of the transversal guide 14 along the longitudinal guides 13 fixed to the support structures 12 operated by means of the actuator device 15.

Preferably, the transversal component of the translation of the first gripping device 30 may be achieved by translation of the slide 16 along the transversal guide 14 extending on the crossbeam 2 operated by means of the actuator device 17.

In a preferred embodiment, it is possible to rotate the handling group 20 about the vertical axis Z to switch places between the first gripping device 30 and the second gripping device 40 and better position the first worked piece P1 relative to the worked piece storage area 6 (see FIG. 8D).

Preferably, this rotation of the handling group 20 is carried out by operating the actuator device 21.

In a preferred embodiment of the method according to which the worked pieces P can be stored according to a vertical or substantially vertical orientation, the first gripping device 30 can be rotated of 90° about the first horizontal axis R1 from the horizontal configuration to the second vertical configuration (FIG. 8E) to change the orientation of the first worked piece P1 from horizontal to essentially vertical.

Preferably, this rotation of the first gripping device 30 is carried out by operating the actuator device 31.

In one embodiment and if appropriate depending on the geometric configuration of the piece storage area 6, the second gripping device 40 may be moved away from the first gripping device 30 by translating the horizontally extending arm 36 along the direction from the first insertion position towards the second extraction position (FIG. 8F).

Preferably, this translation of the second gripping device 40 is carried out by operating the actuator device 38.

In a subsequent step, the first gripping device 30 is translated downwards so as to place the first worked piece P1 in the piece storage area 6 with a horizontal orientation (FIG. 7D) or substantially vertical orientation (FIG. 8G).

Preferably, this translation of the first gripping device 30 is carried out by operating the actuator device 19 which moves the support member 18 of the supporting equipment 10 downwards along the vertical axis Z1 with respect to the slide 16.

Subsequently, the first worked piece P1 is released from the first gripping device 30 by deactivating the suction gripping element 50.

In this way, the finished face F2 of the first worked piece P1 is visible, in particular facing upwards (FIG. 7D) or laterally (FIG. 8G).

The transfer of the first worked piece P1 from the piece-supporting plane 5 to the piece storage area 6 can be carried out in substantially the same way by means of the second gripping device 40.

Next, the apparatus 1 is placed again in the pick-up position by placing the first gripping face 32 of the first gripping device 30 in contact with the finished face F2 of a second worked piece P2 of the pair of pieces P, and the second worked piece P2 is retained by activating the suction gripping element 50 of the first gripping device 30, so as to keep the finished face F2 facing the first gripping device 30 itself (FIG. 7E; 8H).

Next, the first gripping device 30 is translated vertically upwards to lift the second worked piece P2 off the piece-supporting plane 5 (FIG. 7F; 8I).

Preferably, the lifting is carried out by operating the actuator device 21, which leads to a translation along the vertical axis Z1 of the support member 18 of the supporting equipment 10 with respect to the slide 16 (and thus to a translation of the first gripping device 30).

Subsequently, the first gripping device 30 is rotated of 90° about the first horizontal axis R1, from the horizontal configuration to the first vertical configuration (FIG. 7G; 8J), so that the second worked piece P2 faces the second gripping device 40.

Preferably, this rotation is carried out by operating the actuator device 31.

Next, the second gripping device 40 is brought closer to the first gripping device 30, in particular by translating the horizontally extending arm 36 along the horizontal axis A1 in the direction from the second extraction position to the second insertion position (FIG. 7H; 8K) so as to place the second gripping face 42 in contact with the rough face F1 of the second worked piece P2 in the exchange position of the apparatus 1. Preferably, this translation is carried out by operating the actuator device 38.

Subsequently, the second worked piece P2 is released from the first gripping device 30 by deactivating the suction gripping element 50 of the first gripping device 30 and simultaneously retained by the second gripping device 40 by activating the suction gripping element 50 of the second gripping device 40.

In this way, the second worked piece P2 is transferred from the first gripping device 30 to the second gripping device 40 (FIG. 7H; 8K).

Next, the second gripping device 40 is moved away from the first gripping device 30, for example by translating the horizontally extending arm 36 in the direction from the first insertion position to the second extraction position (FIG. 7J, 8M) so as to move the second worked piece P2 away from the first gripping device 30.

Preferably, this translation is carried out by operating the actuator device 38.

Prior to or following the transfer of the second worked piece P2 from the first gripping device 30 to the second gripping device 40, the supporting equipment 10 is moved along the transversal guide 14 between a position where the second worked piece P2 is arranged above the piece-supporting plane 5 to a position where the second worked piece P2 is arranged above substantially at the storage area 6 (FIG. 7I; 8L).

Preferably, this translation movement can have a longitudinal component (parallel to the Y axis) and/or a transversal component (parallel to the X axis).

Preferably, the longitudinal component of the translation is achieved by means of a translation of the crossbeam 2 which the transversal guide 14 is associated to along the longitudinal guides 13 carried out by means of the actuator device 15.

Preferably, the transversal component of the translation is achieved by translating the slide 16 along the transversal guide 14 associated with the crossbeam 2 carried out by means of the actuator device 17.

In a preferred embodiment, the second gripping device 40 is rotated of 90° about the second horizontal axis R2 from the first vertical configuration to the horizontal configuration to change the orientation of the second worked piece P2 from vertical to horizontal (FIG. 7K).

Preferably, this rotation is carried out by operating the actuator device 41.

In another preferred embodiment, the second gripping device 40 is rotated of 180° about the second horizontal axis R2 from a first substantially vertical configuration to a second vertical configuration (FIG. 8N) so that the second worked piece P2 faces vertically away from the first gripping device 30.

Preferably, this rotation is carried out by operating the actuator device 41.

Subsequently, the second gripping device 40 is moved downwards so as to place the second worked piece P2 in the piece storage area 6 in a horizontal orientation (FIG. 7L) or substantially vertical orientation (FIG. 8O).

Preferably, this movement of the second gripping device 40 is carried out by operating the actuator device 19 which translates the support member 18 of the supporting equipment 10 downwards along the vertical axis Z1 with respect to the slide 16.

Subsequently, the second worked piece P2 is released from the second gripping device 40 by deactivating the suction gripping element 50.

In this way, the finished face F2 of the second worked piece rests against the finished face F2 of the first worked piece P1.

The transfer of the second worked piece P2 from the piece-supporting plane 5 to the piece storage area 6 can be carried out in a substantially similar manner by initially picking it up from the piece-supporting plane 5 by means of the second gripping device 40 and subsequently transferring it to the first gripping device 30 in a similar manner to those described above.

Clearly, the above operations can be repeated to move additional pairs of worked pieces P1, P2 from the piece-supporting plane 5 to the piece storage area 6 by arranging the finished faces F2 of each pair of pieces P1, P2 resting against each other.

In further preferred embodiments of the invention, it is also possible to perform the described operations of moving pairs of worked pieces P1, P2 starting from worked pieces P1, P2 with their finished face F2 resting on the piece-supporting plane 5. In this case, what is said with reference to the finished face F2 must be understood as being referred to the rough face F1 and vice versa.

Clearly, a person skilled in the art may make numerous modifications and variations to the apparatus and method of moving pieces described above in order to meet specific and contingent requirements, all of which are within the scope of protection of the present invention as defined by the following claims.

What is claimed is:

1. An apparatus for moving worked pieces of stone material in block or slab form comprising:

a piece-supporting plane configured to support one or more of said worked pieces of stone material;

a first gripping device and a second gripping device, respectively defining a first gripping plane and a second gripping plane, the first gripping device and the second gripping device being configured for retaining a respective one of said worked pieces of stone material; and a stationary piece storage area configured to store stacked pairs of said worked pieces of stone material and located at a spaced apart position with respect to the piece-supporting plane;

wherein the apparatus is configured to move the first gripping device and the second gripping device among:

i) a picking position wherein the first gripping device or the second gripping device is configured to pick up one of said worked pieces of stone material laid on the piece-supporting plane;

ii) an exchange position wherein the first gripping device and the second gripping device are mutually oriented such that said first gripping plane and second gripping plane are facing each other to allow transferring the worked piece of stone material picked up in the picking position from the first gripping device to the second gripping device, or vice versa; and iii) a laying position, wherein the second gripping device or the first gripping device is configured to release in the stationary piece storage area the worked piece of stone material transferred in the exchange position.

2. The apparatus according to claim 1, comprising a single handling group including said first gripping device and second gripping device or a first handling group including said first gripping device and a second handling group including said second gripping device, said first handling group and second handling group being structurally independent from each other.

3. The apparatus according to claim 2, further comprising a supporting equipment of said single handling group or a supporting equipment of said first handling group and a supporting equipment of said second handling group, the supporting equipment being configured to support a respective handling group above said piece-supporting plane.

4. The apparatus according to claim 2, wherein the single handling group comprises a supporting body of said first gripping device and second gripping device, the supporting body being configured to support said first gripping device and second gripping device at a distance from each other along a direction parallel to the piece-supporting plane, or said structurally independent first handling group and second handling group comprise, each, a first supporting body of said first gripping device and, respectively, a second supporting body of said second gripping device, said first support body and second support body being configured to support said first gripping device and second gripping device at a distance from each other along a direction parallel to the piece-supporting plane.

5. The apparatus according to claim 4, comprising a first actuator device configured to move the first gripping device along a direction perpendicular to the piece-supporting plane and relatively to said supporting body of the single handling group or of the first handling group.

6. The apparatus according to claim 4, comprising a second actuator device configured to move the second gripping device along a direction perpendicular to the piece-supporting plane and relatively to said supporting body of the single handling group or of the second handling group.

7. The apparatus according to claim 4, wherein the first gripping device is rigidly fixed to said supporting body of the single handling group, or of the first handling group, by a respective first vertically extending supporting arm.

8. The apparatus according to claim 4, wherein the first gripping device is movably associated to said supporting body of the single handling group by means of a respective first supporting arm comprising a respective horizontally extending portion and a respective vertically extending portion.

9. The apparatus according to claim 4, wherein the first gripping device is movably associated to said supporting body of the single handling group or of the first handling group, by means of a respective first vertically extending supporting arm and wherein the apparatus comprises a third actuator device active on the first supporting arm of the first gripping device and configured to move the first gripping device in parallel to the piece-supporting plane by sliding the first supporting arm on or in the supporting body of the single handling group.

10. The apparatus according to claim 8, comprising a third actuator device active on the first supporting arm of the first gripping device and configured to move said first supporting arm and said first gripping device in parallel to the piece-supporting plane towards and away from said supporting body of the single handling group.

11. The apparatus according to claim 4, wherein the second gripping device is movably associated to said supporting body of the single handling group by means of a respective second supporting arm comprising a respective horizontally extending portion and a respective vertically extending portion.

12. The apparatus according to claim 11, comprising a fourth actuator device active on the second supporting arm of the second gripping device and configured to move the second gripping device in parallel to said piece-supporting plane by sliding the second supporting arm on or in the supporting body of the single handling group.

13. The apparatus according to claim 11, comprising a fourth actuator device active on the second supporting arm of the second gripping device and configured to move said second supporting arm and said second gripping device in parallel to said piece-supporting plane and towards and away from said supporting body of the single handling group.

14. The apparatus according to claim 8, wherein in the supporting body of the single handling group a housing zone is defined of the horizontally extending portion of the first supporting arm of the first gripping device.

15. The apparatus according to claim 11, wherein in the supporting body of the single handling group a housing zone is defined of the horizontally extending portion of the horizontally extending portion of the second supporting arm of the second gripping device.

16. The apparatus according to claim 10, wherein in the supporting body of the single handling group a housing zone is defined of the horizontally extending portion of the first supporting arm of the first gripping, and wherein the third actuator device is configured to insert and respectively extract the horizontally extending portion of the first supporting arm of the first gripping device into and out of said housing zone.

17. The apparatus according to claim 13, wherein in the supporting body of the single handling group a housing zone is defined of the horizontally extending portion of the horizontally extending portion of the second supporting arm of the second gripping device, and wherein the fourth actuator device is configured to insert and respectively extract the horizontally extending portion of the second supporting arm of the second gripping device into and out of said housing zone.

18. The apparatus according to claim 10, wherein in the supporting body of the single handling group a housing zone is defined of the horizontally extending portion of the first supporting arm of the first gripping device, wherein the third actuator device is configured to move the horizontally extending portion of the first supporting arm of the first gripping device along a direction substantially parallel to the piece-supporting plane between:

a first insertion position wherein the horizontally extending portion of the first supporting arm of the first gripping device is substantially completely housed in said housing zone defined in the supporting body of the single handling group; and a second extraction position wherein the horizontally extending portion of the first supporting arm of the first gripping device is at least partially extending in a cantilevered fashion externally to the supporting body of the single handling group.

19. The apparatus according to claim 13, wherein in the supporting body of the single handling group a housing zone is defined of the horizontally extending portion of the horizontally extending portion of the second supporting arm of the second gripping device, and wherein the fourth actuator device is configured to move the horizontally extending portion of the second supporting arm of the second gripping device along a direction substantially parallel to the piece-supporting plane between:

a first insertion position wherein the horizontally extending portion of the second supporting arm of the second gripping device is substantially completely housed in said housing zone defined in the supporting body of the single handling group; and a second extraction position wherein the horizontally extending portion of the second supporting arm of the second gripping device is at least partially extending in a cantilevered fashion externally to the supporting body of the single handling group.

20. The apparatus according to claim 1, wherein the first gripping device is hinged to a respective vertically extending first supporting arm at a free end of the first supporting arm and the second gripping device is hinged to a respective vertically extending second supporting arm at a free end of the second supporting arm.

21. The apparatus according to claim 11, wherein the first gripping device is hinged to a vertically extending portion of the first supporting arm at a free end of the vertically extending portion of the first supporting arm, and the second gripping device is hinged to a vertically extending portion of the second supporting arm at a free end of the vertically extending portion of the second supporting arm.

22. The apparatus according to claim 1, comprising:

a fifth actuator device configured to rotate the first gripping device about a first horizontal axis substantially parallel to the piece-supporting plane; and/or a sixth actuator device configured to rotate the second gripping device about a second horizontal axis substantially parallel to the piece-supporting plane.

23. The apparatus according to claim 1, comprising at least one seventh actuator device configured to rotate the first gripping device and/or the second gripping device about a respective vertical axis substantially perpendicular to the respective piece-supporting plane.

24. A method for moving worked pieces of stone material in block or slab form having a rough face and an opposite finished face by means of an apparatus for moving the worked pieces of stone material comprising:

a piece-supporting plane configured to support one or more of said worked pieces of stone material; and a first gripping device and a second gripping device, respectively defining a first and a second gripping plane of one of said worked pieces of stone material, the first gripping device and the second gripping device being configured for retaining a respective one of said worked pieces of stone material;

the method comprising the steps of:

a) providing a plurality of said worked pieces of stone material with the rough face laid on the piece-supporting plane and the finished face facing away from the piece-supporting plane or vice versa, with the finished face laid on the piece-supporting plane and the rough face facing away from the piece-supporting plane;

b) picking up from the piece-supporting plane a first piece of a pair of said worked pieces of stone material on the piece-supporting plane by means of one of the first gripping device or the second gripping device keeping the finished face or the rough face of the first piece of the pair of worked pieces of stone material facing the gripping device used to pick up the first piece;

c) moving the first piece of the pair of worked pieces of stone material towards a piece storage area by means of the first or the second, gripping device, used in step b);

d) releasing the first piece of the pair of worked pieces of stone material in the piece storage area leaving visible the finished face or the rough face;

e) picking up from the piece-supporting plane a second piece of the pair of worked pieces of stone material by means of one of the first gripping device or the second gripping device keeping the finished face or the rough face of the second piece of the pair of worked pieces of stone material facing towards the gripping device used to pick up the second piece;

f) positioning the first gripping device and the second gripping device in an exchange position wherein the first gripping device and the second gripping device are mutually oriented such that said first and second gripping planes of the second piece of the pair of worked pieces of stone material are facing each other;

g) transferring the second piece of the pair of worked pieces of stone material from the first gripping device to the second gripping device in such a way as to orient the finished face or the rough face of the second piece of the pair of worked pieces of stone material away from the second gripping device, or transferring the second piece of the pair of worked pieces of stone material from the second gripping device to the first gripping device in such a way as to orient the finished face or the rough face of the second piece of the pair of worked pieces of stone material away from the first gripping device;

h) moving the second piece of the pair of worked pieces of stone material towards said piece storage area by means of the first or second gripping device, which the second piece is transferred to in step g);

i) releasing the second piece of the pair of worked pieces of stone material in the piece storage area by means of the first or second gripping device which the piece is transferred to in step g) lying the finished face of the second piece against the visible finished face of the first piece of the pair of worked pieces of stone material or the rough face of the second piece against the visible rough face of the first piece;

l) optionally, repeating steps a)-i) on one or more further pairs of worked pieces of stone material.

25. The method according to claim 24, wherein said apparatus comprises a single handling group including said first and second gripping devices, and wherein said step b) of picking up the first piece of the pair of worked pieces of stone material from the piece-supporting plane and/or said step e) of picking up the second piece of the pair of worked pieces of stone material from the piece-supporting plane by means of one of the first gripping device or the second gripping device comprises:

moving a supporting body of the single handling group towards the piece-supporting plane; and/or moving one of the first gripping device or the second gripping device towards the piece-supporting plane relatively to the supporting body of the single handling group; and operating the first gripping device or the second gripping device to associate the first piece or the second piece of the pair of worked pieces of stone material to the first gripping device or to the second gripping device.

26. The method according to claim 24, wherein said apparatus comprises a first handling group including said first gripping device and a second handling group including said second gripping device, said first and second handling groups being structurally independent from each other, and wherein said step b) of picking up the first piece of the pair of worked pieces of stone material from the piece-supporting plane and/or said step e) of picking up the second piece of the pair of worked pieces of stone material from the piece-supporting plane by means of one of the first gripping device or the second gripping device comprises:

moving a supporting body of the first handling group or of the second handling group towards the piece-supporting plane; and/or moving one of the first gripping device or the second gripping device towards the piece-supporting plane relatively to a respective supporting body of the first or the second handling group; and operating the first gripping device or the second gripping device to associate the first piece or the second piece of the pair of worked pieces of stone material to the first gripping device or to the second gripping device.

27. The method according to claim 24, wherein said step f) of positioning the first gripping device and the second gripping device in the exchange position comprises rotating the first gripping device and the second gripping device so as to arrange said first and second gripping planes of the picked up piece of the pair of worked pieces of stone material in a mutually facing position.

28. The method according to claim 24, wherein said step h) of moving the second piece of the pair of worked pieces of stone material towards said piece storage area comprises:

rotating the second gripping device to orient the respective second gripping plane and the finished face or the rough face of the second piece of the pair of worked pieces of stone material in a position parallel to the piece-supporting plane or in a position facing away from the first gripping plane, or rotating the first gripping device to orient the respective first gripping plane and the finished face or the rough face of the second piece of the pair of worked pieces of stone material in a position parallel to the piece-supporting plane or in a position facing away from the second gripping plane.

29. The method according to claim 24, wherein said step h) of moving the second piece of the pair of worked pieces of stone material towards said piece storage area comprises rotating the second gripping device or the first gripping device about a horizontal rotation axis to orient the finished face or the rough face of the second piece of the pair of worked pieces of stone material such that said finished face or rough face is facing the visible finished face or the visible rough face of the first piece of the pair of worked pieces of stone material previously released in the piece storage area.

30. The method according to claim 24, wherein said steps b)-d) are performed without transferring said first piece from the first gripping device to the second gripping device.

31. An apparatus for moving worked pieces of stone material in block or slab form comprising:

a piece-supporting plane configured to support one or more of said worked pieces of stone material;

a first gripping device and a second gripping device, respectively defining a first gripping plane and a second gripping plane configured for retaining a respective one of said worked pieces of stone material, the first gripping device and the second gripping device being configured for retaining a respective one of said worked pieces of stone material; and wherein the apparatus is configured to move the first gripping device and the second gripping device among:

i) a picking position, wherein the first gripping device or the second gripping device is configured to pick up one of said worked pieces of stone material laid on the piece-supporting plane;

ii) an exchange position, wherein the first gripping device and the second gripping device are mutually oriented such that said first gripping plane and second gripping plane are facing each other to allow transferring the worked piece of stone material picked up in the picking position from the first gripping device to the second gripping device, or vice versa; and iii) a laying position, wherein the second gripping device or the first gripping device is configured to release in a piece storage area the worked piece of stone material transferred in the exchange position.

32. The apparatus according to claim 31, wherein the apparatus is further configured to move:

the first gripping device from the picking position to the laying position to release from the first gripping device said worked piece of stone material picked up by the first gripping device in the picking position; and/or the second gripping device from the picking position to the laying position to release from the second gripping device said worked piece of stone material picked up by the second gripping device in the picking position.

* * * * *